US012497395B2

(12) United States Patent
Strovel et al.

(10) Patent No.: US 12,497,395 B2
(45) Date of Patent: Dec. 16, 2025

(54) SMALL MOLECULE BROMODOMAIN INHIBITORS AND USES THEROF

(71) Applicants: ConverGene, LLC, Cambridge, MD (US); THE UNITED STATES OF AMERICA, AS REPRESENTED BY THE SECRETARY, DEPARTMENT OF HEALTH AND HUMAN SERVICES, Bethesda, MD (US)

(72) Inventors: Jeffrey W. Strovel, Laurel, MD (US); Makoto Yoshioka, Gaithersburg, MD (US); David J. Maloney, Point of Rocks, MD (US); Shyh Ming Yang, Doylestown, PA (US); Ajit Jadhav, Chantilly, VA (US); Daniel Jason Urban, Poolesville, MD (US)

(73) Assignees: ConverGene, LLC; The United States of America, as Represented by the Secretary, Department of Health and Human Services ( * ) Notice: Subject to any disclaimer, the term of this patent is extended or adjusted under 35 U.S.C. 154(b) by 942 days.

(21) Appl. No.: 17/605,469

(22) PCT Filed: Mar. 11, 2020

(86) PCT No.: PCT/US2020/022072
§ 371 (c)(1),
(2) Date: Oct. 21, 2021

(87) PCT Pub. No.: WO2020/219168
PCT Pub. Date: Oct. 29, 2020

(65) Prior Publication Data
US 2022/0259200 A1 Aug. 18, 2022

Related U.S. Application Data

(60) Provisional application No. 62/838,083, filed on Apr. 24, 2019.

(51) Int. Cl.
C07D 471/04 (2006.01)
A61P 11/00 (2006.01)
A61P 35/00 (2006.01)
C07D 413/14 (2006.01)

(52) U.S. Cl.
CPC ............ C07D 471/04 (2013.01); A61P 11/00 (2018.01); A61P 35/00 (2018.01); C07D 413/14 (2013.01)

(58) Field of Classification Search
CPC ..... C07D 471/04; C07D 413/14; A61P 11/00; A61P 35/00
See application file for complete search history.

(56) References Cited

U.S. PATENT DOCUMENTS

| 3,755,332 | A | 8/1973 | Wasley et al. |
| 9,765,039 | B2 | 9/2017 | Fairfax et al. |
| 10,508,106 | B2 * | 12/2019 | Strovel ................ C07D 471/04 |
| 2018/0009292 | A1 | 1/2018 | Suzuki et al. |
| 2018/0134715 | A1 | 5/2018 | Vankayalapati et al. |
| 2019/0092761 | A1 | 3/2019 | Yoshioka et al. |

FOREIGN PATENT DOCUMENTS

| EP | 0393926 A1 | 10/1990 |
| EP | 1012166 B1 | 10/2003 |
| EP | 1430030 B1 | 5/2005 |
| EP | 1854789 A1 | 11/2007 |
| EP | 2072502 A1 | 6/2009 |
| EP | 2221301 A1 | 8/2010 |
| EP | 2650286 A1 | 10/2013 |
| EP | 1865958 B1 | 7/2015 |
| EP | 3056207 A1 | 8/2016 |
| WO | 1993003030 A1 | 2/1993 |
| WO | 2006121767 A2 | 11/2006 |
| WO | 2008054599 A2 | 5/2008 |
| WO | 2008117079 A1 | 10/2008 |
| WO | 2008141843 A1 | 11/2008 |
| WO | 2011054846 A1 | 5/2011 |
| WO | 2011140442 A1 | 11/2011 |
| WO | 2012040499 A2 | 3/2012 |
| WO | 2012125913 A1 | 9/2012 |
| WO | 2012143416 A2 | 10/2012 |
| WO | 2013003586 A1 | 1/2013 |
| WO | 2014089546 A1 | 6/2014 |

(Continued)

OTHER PUBLICATIONS

Crawford, Terry D., Vickie Tsui, E. Megan Flynn, Shumei Wang, Alexander M. Taylor, Alexandre Côté, James E. Audia et al. "Diving into the water: inducible binding conformations for BRD4, TAF1 (2), BRD9, and CECR2 bromodomains." Journal of Medicinal Chemistry 59, No. 11 (2016): 5391-5402. (Year: 2016).*
Yang et al "Lead optimization and efficacy evaluation of quinazoline-based BET family inhibitors for potential treatment of cancer and inflammatory diseases." Bioorganic & medicinal chemistry letters 29, No. 10 (2019): 1220-1226. (Year: 2019).*
International Search Report of International Application No. PCT/US20/22072, mailed Jul. 24, 2020.
Roberto Sanchez et al., "The role of human bromodomains in chromatin biology and gene transcription", Curr. Opin. Drug Discov. Devel., Sep. 2009, pp. 659-665, vol. 12, No. 5.
Gerald V. Denis, "Bromodomain Coactivators in Cancer, Obesity, Type 2 Diabetes, and Inflammation", Discov. Med., Dec. 2010, pp. 489-499 vol. 10, No. 55.

(Continued)

Primary Examiner — James H Alstrum-Acevedo
Assistant Examiner — Carolyn L. Ladd
(74) Attorney, Agent, or Firm — DUANE MORRIS LLP

(57) ABSTRACT

The present invention relates to compounds that bind to and otherwise modulate the activity of bromodomain-containing proteins, including BRD4, to processes for preparing these compounds, to pharmaceutical compositions containing these compounds, and to methods of using these compounds for treating a wide variety of conditions and disorders. In particular, this disclosure provides certain BRD4 inhibitors for the treatment of fibrotic diseases or conditions.

13 Claims, 1 Drawing Sheet

(56) References Cited

FOREIGN PATENT DOCUMENTS

| WO | 2015015318 A2 | 2/2015 | | |
|---|---|---|---|---|
| WO | 2016/077656 A2 | 5/2016 | | |
| WO | 2016120808 A1 | 8/2016 | | |
| WO | 2016/139292 A1 | 9/2016 | | |
| WO | 2016/146738 A1 | 9/2016 | | |
| WO | WO-2016168682 A2 * | 10/2016 | ........... | A61K 31/428 |
| WO | WO-2017091661 A1 * | 6/2017 | .............. | A61P 25/28 |

OTHER PUBLICATIONS

Gerald V. Denis, "An emerging role for bromodomain-containing proteins in chromatin regulation and transcriptional control of adipogenesis", FEBS Lett., Aug. 4, 2010, pp. 3260-3268, vol. 584, No. 15.

Jianxin You et al., "Kaposi's Sarcoma-Associated Herpesvirus Latency-Associated Nuclear Antigen Interacts with Bromodomain Protein Brd4 on Host Mitotic Chromosomes", J. Virol., Sep. 2006, pp. 8909-8919, vol. 80, No. 18.

Maria G. McPhillips et al., "Interaction of Bovine Papillomavirus E2 Protein with Brd4 Stabilizes Its Association with Chromatin", J Virol., Jul. 2005, pp. 8920-8932, vol. 79, No. 14.

Ted Abel et al., "Epigenetic targets of HDAC inhibition in neurodegenerative and psychiatric disorders", Curr. Opin. Pharmacol., Feb. 2008, pp. 57-64, vol. 8, No. 1.

Johannes Zuber et al., "RNAi screens identifies Brd4 as a therapeutic target in acute myeloid leukaemia", Nature, Aug. 3, 2011, pp. 524-528, vol. 478, No. 7370.

Panagis Filippakopoulos et al., "Selective inhibition of BET bromofomains", Nature, Dec. 23, 2010, pp. 1067-1073, vol. 468, No. 7327.

Jennifer A. Mertz et al., "targeting MYC dependence in cancer by inhibiting BET bromodomains", Proc. Nat.l Acad. Sci., Oct. 4, 2011, pp. 16669-16674, vol. 108, No. 40.

Alexander Puissant et al., "Targeting MYCN in Neiroblastoa by BET Bromodomain Inhibition", Cancer Discov., Mar. 2013, pp. 308-323, vol. 3, No. 3.

Beverley M. Dancy et al., "Protein Lysine Acetylation by p300/CBP", Chem Rev., Mar. 25, 2015, pp. 2419-2452., vol. 115 No. 6.

Sarah Picaud et al. "Generation of a Selective Small Molecule Inhibitor of the CBP/p300 Bromodomain for leukemia", Cancer Res., Dec. 1, 2015, pp. 5106-5119, vol. 75, No. 23.

Loren M. Lasko et al., "Discovery of a potent catalytic p300/CBP inhibitor that targets lineage-specific tumors", Nature., Oct. 5, 2017, pp. 128-132, vol. 550, No. 7674.

Hideaki Ogiwara et al., "Targeting p300 Addiction in CBP-Deficient Cancers Caused Synthetic Lethality by Apoptotic Cell Death due to Abrogation of MYC Expression", Cancer Discov., Apr. 2016, pp. 430-445, vol. 6, No. 4.

Andrew R. Conery et al., "Bromodomain inhibition of the transcriptional coactivators CBP/EP300 as a therapeutic strategy to target the IRF4 network in multiple myeloma", Elife, Jan. 5, 2016, vol. 5, e10483.

Gao, Zhan-Guo, et al. "Identification of essential residues involved in the allosteric modulation of the human A3 adenosine receptor." Molecular pharmacology 63.5 (2003): 1021-1031.

Yang, Su Hui, et al. "Synthesis, in vitro and in vivo evaluation of 3-arylisoquinolinamines as potent antitumor agents." Bioorganic & Medicinal Chemistry Letters 20.17 (2010): 5277-5281.

Marvania, Bhavin, et al. "The synthesis and biological evaluation of new DNA-directed alkylating agents, phenyl N-mustard-4-anilinoquinoline conjugates containing a urea linker." European Journal of Medicinal Chemistry 83 (2014): 695-708.

Moyer, Mikel P., et al. "The synthesis and identification of 4, 6-diaminoquinoline derivatives as potent Immunostimulants." Bioorganic & Medicinal Chemistry Letters 2.12 (1992): 1589-1594.

Abouzid, Khaled, and Samia Shouman. "Design, synthesis and in vitro antitumor activity of 4-aminoquinoline and 4-aminoquinazoline derivatives targeting EGFR tyrosine kinase." Bioorganic & Medicinal Chemistry 16.16 (2008):7543-7551.

Stuhlmiller, Timothy J., et al. "Inhibition of lapatinib-induced kinome reprogramming in ERBB2-positive breast cancer by targeting BET family bromodomains." Cell Reports 11.3 (2015): 390-404.

Extended European Search Report in EP Application No. 22162126.1, dated Jul. 20, 2022, in 21 pages.

Extended European Search Report in EP Application No. 20794764.9, dated Sep. 29, 2022, in 7 pages.

Yang, Shyh-Ming, et al. "Lead optimization and efficacy evaluation of quinazoline-based BET family inhibitors for potential treatment of cancer and inflammatory diseases." Bioorganic & Medicinal Chemistry Letters 29.10 (2019): 1220-1226.

* cited by examiner

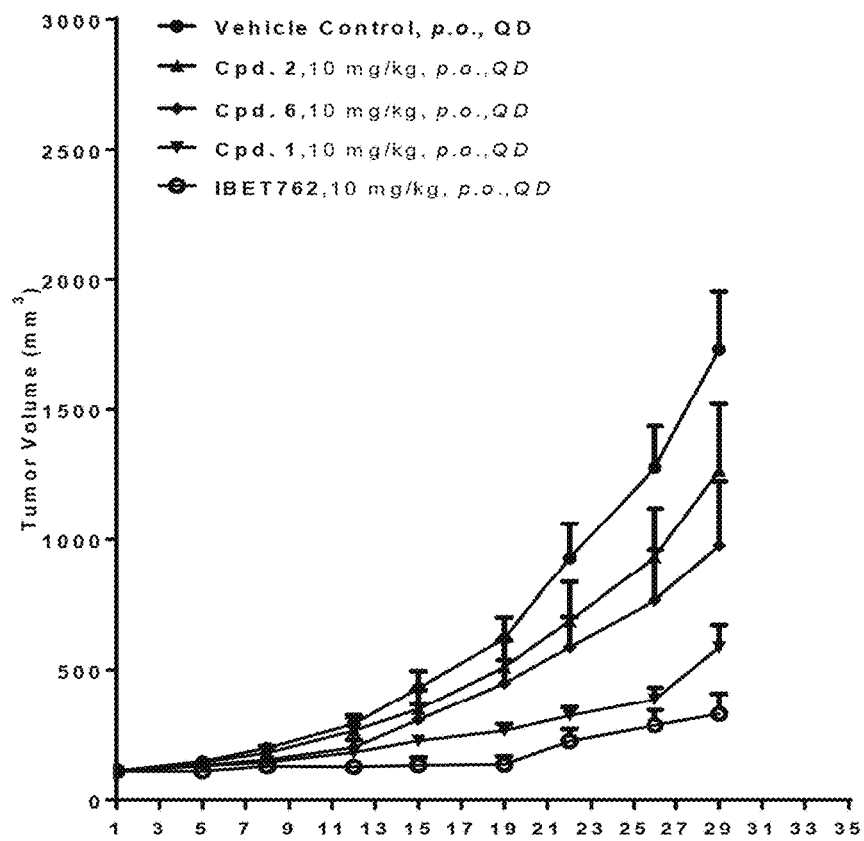
(A)
The Tumor Weight of the Mice in the Different Groups
(MEAN±SEM)
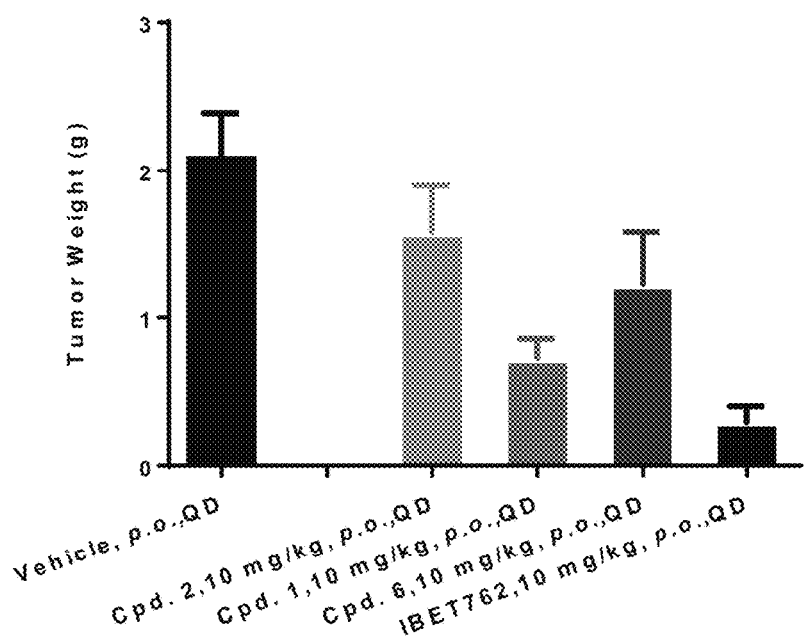
(B)

SMALL MOLECULE BROMODOMAIN INHIBITORS AND USES THEROF

CROSS-REFERENCE TO RELATED APPLICATIONS

This application is the National Stage entry of International Application No. PCT/US2020/22072, filed 11 Mar. 2020, which claims priority to U.S. Provisional Application No. 62/838,083, filed 24 Apr. 2019.

BACKGROUND

Field of the Invention

The present invention relates to compounds that inhibit bromodomain-containing proteins from binding acetylated proteins, to processes for preparing these compounds, to pharmaceutical compositions containing these compounds, and to methods of using these compounds for treating a wide variety of medical conditions, diseases, or disorders.

Description of Related Art

Epigenetic chromatin remodeling is a central mechanism for the regulation of gene expression. Pharmacological modulation of epigenetic change represents a new mode of therapeutic interventions for cancer and inflammation. Emerging evidence suggests that such epigenetic modulations may also provide therapeutic means for treatment of obesity, as well as metabolic, cardiovascular, neurodegenerative, psychiatric and infectious diseases.

The eukaryotic genome is organized into a basic packaging unit called a nucleosome, which is comprised of approximately 147 base pairs of double-stranded DNA helix wound around a histone octamer, which, in turn, consists of two subunits each of H2A, H2B, H3, and H4 proteins. Nucleosomes are further packaged into chromatin structures, which can exist in a relatively loose state of euchromatin or in a tightly packed heterochromatin structure. Transition from heterochromatin to euchromatin allows transcription of genes, although not all of the genes in euchromatin structure are transcribed. This transition from heterochromatin to euchromatin is controlled by post-translational modifications of histone proteins, including acetylation of lysine residues in H3/H4 proteins. Histone acetylation is catalyzed by histone acetyltransferases (HATs), resulting in open euchromatin structures that allow transcription of genes including tumor suppressor genes. Conversely, histone deacetylation leads to suppression of such genes and this activity is catalyzed by histone deacetylases (HDACs). Inhibition of histone deacetylases is a mode of cancer treatment and vorinostat (Zolinze), a histone deacetylase inhibitor, has been shown to be an effective drug for cutaneous T-cell lymphoma in humans.

Histone acetylation also is modulated by bromodomain-containing proteins. A bromodomain is an approximately 110 amino acid-long evolutionarily conserved bundle of four alpha-helices that binds to acetyllysine residues of acetylated proteins. These domains are present in a number of chromatin-associated proteins including HATs. Bromodomains were first identified as a novel structural motif in the brahma protein, a regulator of Drosophila homeotic genes, but are also found in proteins in humans and yeast either as single-copy or contiguously repeated domains, and are thought to confer specificity for the complex pattern of epigenetic modifications known as the histone code (Cell. 1992 Feb. 7; 68(3):561-72; J. Biomol. Screen. 2011 December; 16(10):1170-85). The human genome encodes approximately 50 bromodomain-containing proteins (Bioinformatics. 2004 Jun. 12; 20(9):1416-27), some of which may be involved in etiology of cancer, inflammation, obesity, metabolic, cardiovascular, neurodegenerative, psychiatric and infectious diseases (Med. Chem. Commun. 2012 Jan. 4 3(2):123-134; Curr. Opin. Drug Discov. Devel. 2009 September; 12(5):659-65; Discov. Med. 2010 December; 10(55):489-99; FEBS Lett. 2010 Aug. 4; 584(15):3260-8; J. Virol. 2006 September; 80(18):8909-19; J Virol. 2005 July; 79(14):8920-32; Curr. Opin. Pharmacol. 2008 February; 8(1):57-64). Thus, inhibition and/or modulation of bromodomain-containing proteins may present a new mode of pharmacological intervention for such diseases. Of approximately 50 bromodomain-containing proteins encoded by the human genome, BET proteins represent a small protein family that includes BRD2, BRD3, BRD4 and BRDT. BET proteins contain two tandem bromodomains followed by an extraterminal (ET) domain for protein-protein interaction in the carboxy-terminal region (J. Biol Chem. 2007 May 4; 282(18):13141-5). BET proteins bind to acetylated nucleosomes and are thought to function by opening chromatin structure and/or by facilitating transcriptional initiation (Front. Biosci. 2001 Aug. 1; 6:D1008-18).

Previously, inhibition of BRD4, either by a BRD4-specific RNAi or by a small-molecule BET inhibitor (JQ1), was unequivocally shown to induce suppression of MYC oncogene (Nature 2011 Aug. 3; 478(7370):524-8). This indirect suppression of MYC gene expression as a secondary effect of BRD4 inhibition comprises the central mechanism of action exerted by a BET inhibitor.

Inhibition of BET proteins was shown to be an effective mode of intervention in rodent models of human NUT midline carcinoma, multiple myeloma, Burkitt's lymphoma and acute myeloid leukemia by suppressing the expression of MYC gene (Nature 2010 Dec. 23; 468(7327):1067-73; Cell. 2011 Sep. 16; 146(6):904-1; Proc. Natl. Acad. Sci. USA. 2011 Oct. 4; 108(40):16669-74), as well as MYCN gene (Cancer Discov. 2013 March: 3(3) 308-23). MYC and homologous genes are some of the most overexpressed genes in human cancers; however, there has not been a pharmaceutical compound that directly antagonizes the activity of proteins encoded by the MYC gene and homologous genes to date partly due to the lack of effective drug binding sites. Thus, there exists a need for a means of indirect suppression of the expression of the MYC and homologous genes by inhibiting bromodomains of BET proteins which provide an effective mode of treatment for various diseases, disorders or medical conditions, including various cancers.

In addition to bromodomain-containing proteins, CBP and p300 are two paralogous histone acetyltransferases (HATs) with additional functions as transcription co-activators. Through their multiple protein-interacting domains that include a bromodomain adjacent to HAT catalytic domain, CBP and p300 interact with over 400 proteins thereby playing key roles in various physiological and pathological processes (Cell Mol Life Sci. 2013 November; 70(21):3989-4008; Chem Rev. 2015 Mar. 25; 115(6):2419-52).

CBP and p300 are now recognized as therapeutic targets for various types of cancer. For example, a small molecule that targets bromodomain of CBP/p300 was shown to be effective in experimental models of leukemia (Cancer Res. 2015 Dec. 1; 75(23):5106-5119), whereas a HAT catalytic inhibitor showed efficacy in experimental models of prostate cancer (Nature. 2017 Oct. 5; 550(7674):128-132).

Importantly, CBP and p300 were shown to constitute a paralogous target pair amenable to synthetic lethality, where an inactivating mutation in one gene makes cancer cells susceptible to a drug that targets a product of a second gene due to pathway interdependencies (Cancer Discov. 2016 April; 6(4):430-45). This specific type of synthetic lethality is termed 'paralog targeting' and is expected to be applicable to a wide range of cancer types that harbor loss-of-function mutations in CBP or p300 genes. For example, CBP and p300 genes were found to be mutated in 33.3% and 8.8% of follicular lymphoma cases; 13.3% each for marginal zone B-cell lymphoma cases; 28.6% and 26.8% of skin squamous cell carcinoma cases; 8.0% and 7.2% of endometrial carcinoma cases; and 7.7% and 8.3% cases of lung small-cell carcinoma, respectively (Cold Spring Harb Perspect Med. 2017 Mar. 1; 7(3). pii: a026534; Cancer Discov. 2016 April; 6(4):430-45).

Additionally, bromodomain inhibition of CBP/p300 was shown to suppress the expression of IRF4 gene, a transcription factor that known to control the expression of MYC oncogene, resulting in growth inhibition of multiple myeloma cells (Elife. 2016 Jan. 5; 5. pii: e10483). Thus, inhibition of CBP/p300 with a small molecule can be a potential mode of cancer therapy regardless of mutation status of CBP or p300 gene.

Accumulating evidence showing the importance of CBP and p300 in oncogenesis, along with early signs of effectiveness of BET inhibitors in clinical studies collectively indicate that a multibromodomain inhibitors that simultaneously target BET/CBP/p300 proteins may confer superior efficacy over simple BET inhibitors, while preventing the occurrence of drug resistance, especially in cancer that harbor mutations in CBP or p300 genes.

SUMMARY OF THE INVENTION

The present invention provides, inter alia, compounds of Formula (I):

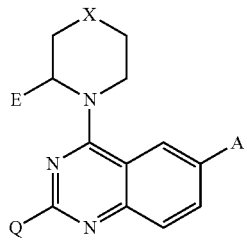

Formula (I)

and tautomer, optical- or stereo-isomer thereof, or a pharmaceutically acceptable salt thereof, wherein:

X is O, NH, NC(O)C$_{1-3}$alkyl,

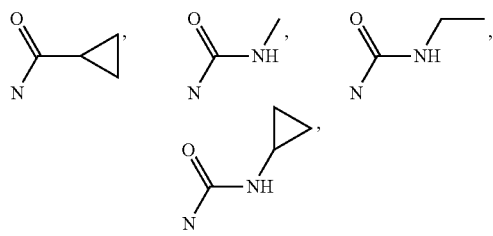

or NS(O)$_2$Me;

A is

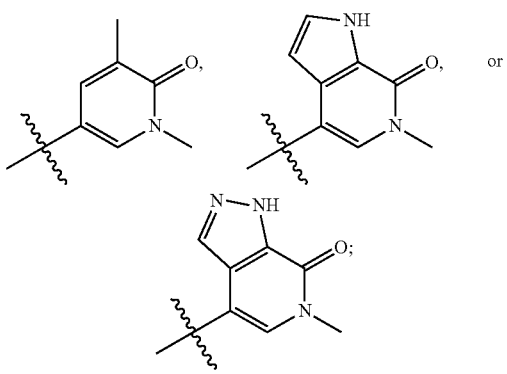

E is

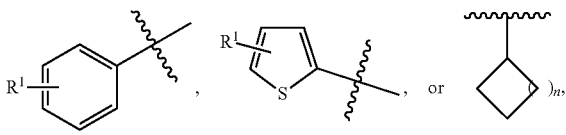

wherein R$^1$ is H, halogen, or Me; n is 0, 1, 2, or 3; and Q is:

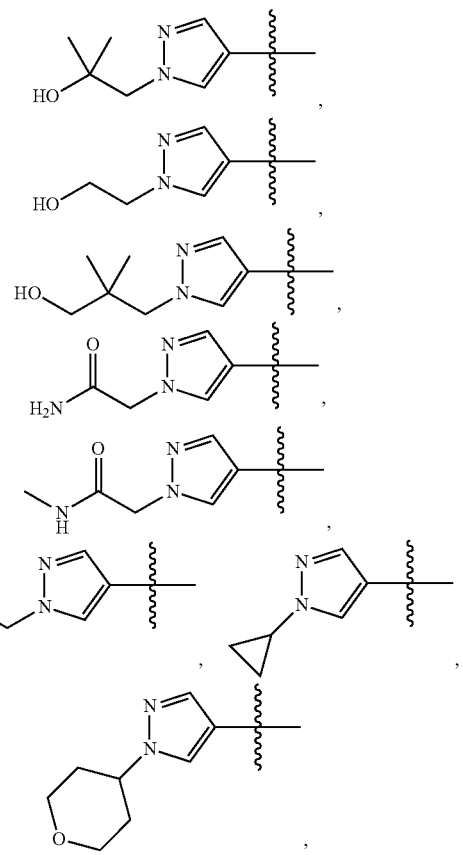

-continued
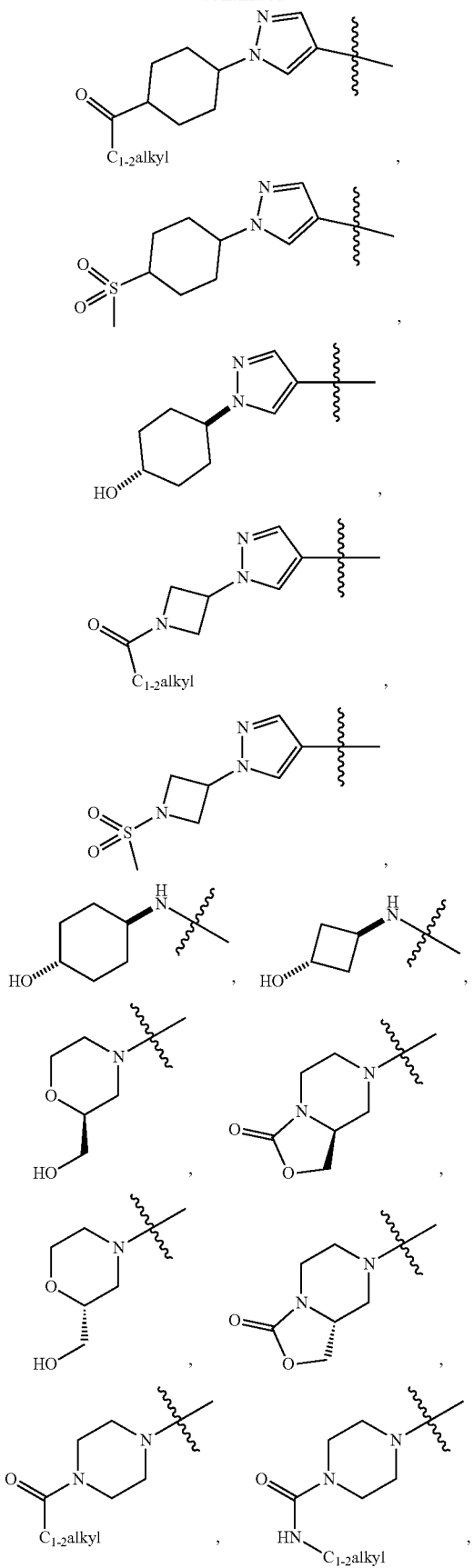
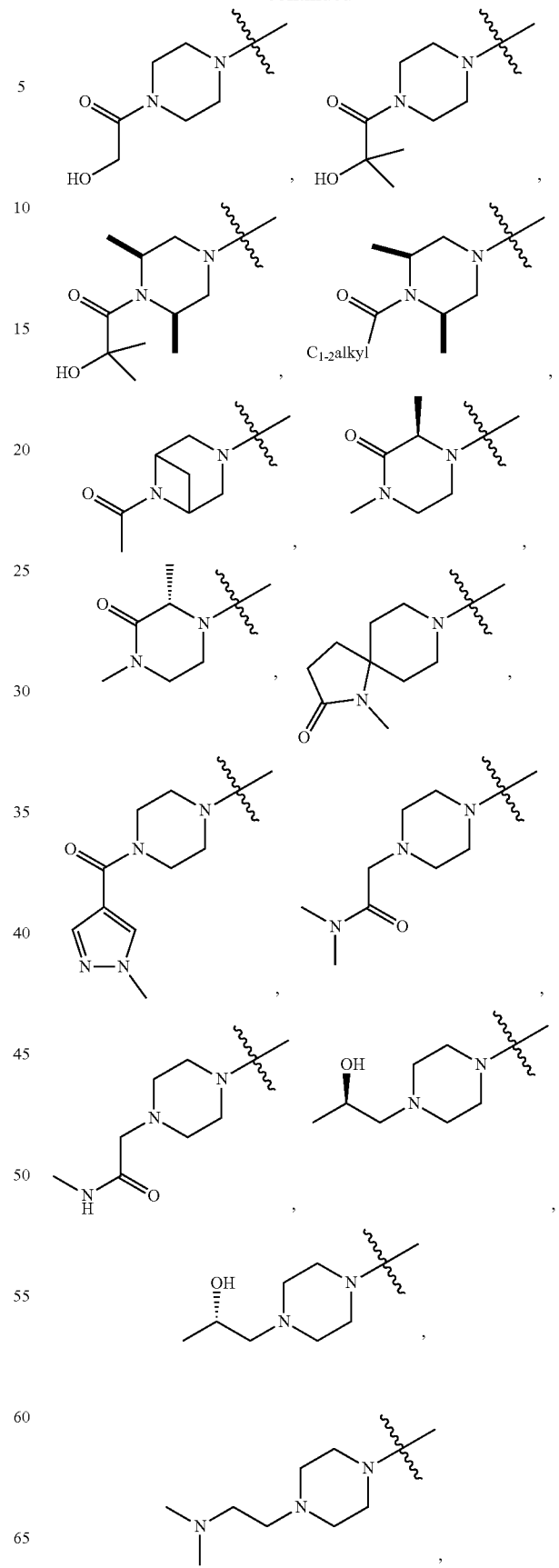

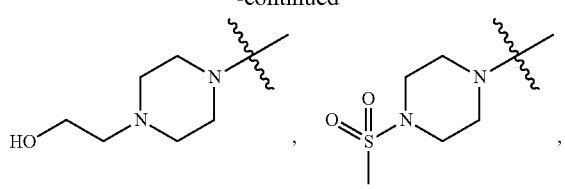

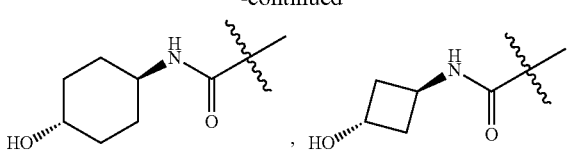

In one embodiment, the present invention provides for compounds of Formula (II), Formula (II)

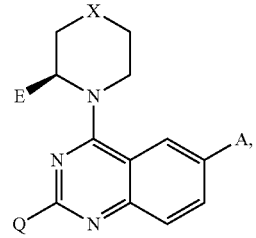

and pharmaceutically acceptable salts thereof.

Wherein the X, E, Q, and A substituents are as defined in Formula (I).

Preferably, X is O, NC(O)Me, or NS(O)$_2$Me. Even more preferably, X is O.

Preferably A is

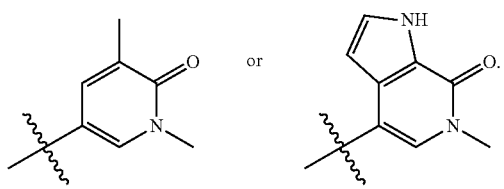

Preferably E is

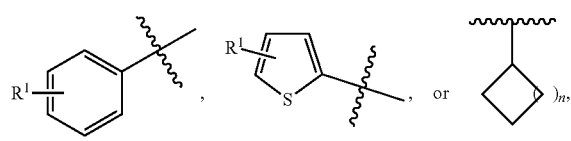

wherein $R^1$ is H, F, Cl; n is 0, 1, 2, or 3.

Even more preferably, E is

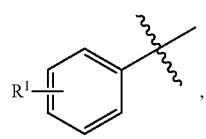

wherein $R^1$ is H, F, Cl.

Preferably Q is
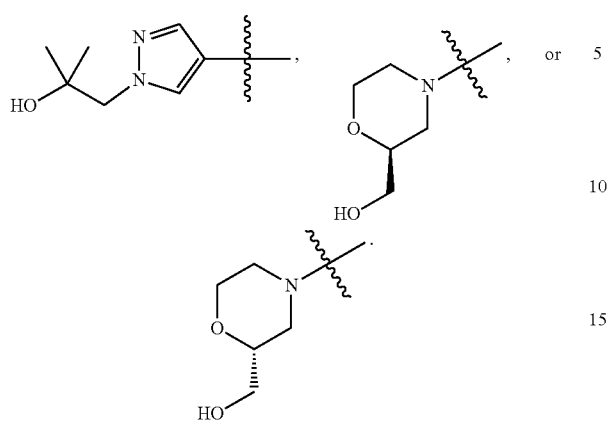
Even more preferably, Q is
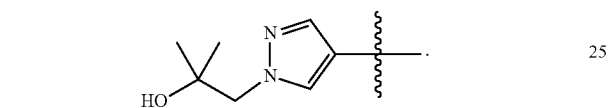
Even more preferably, the compound of Formula (I) is selected from the group consisting of:
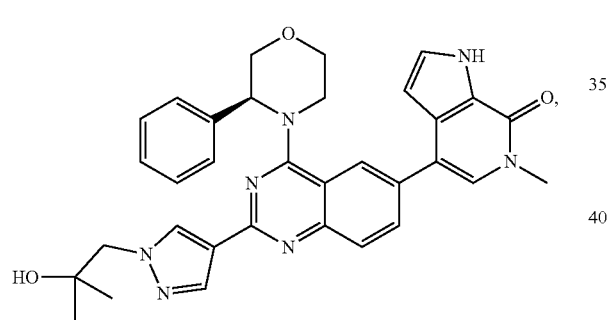
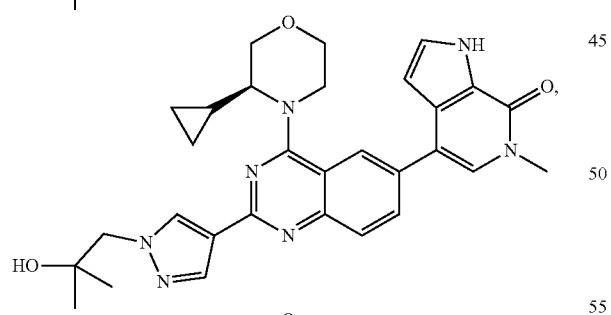
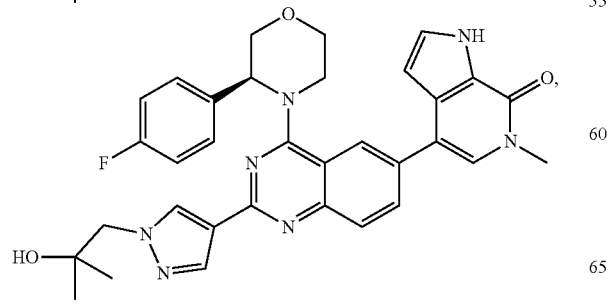
-continued
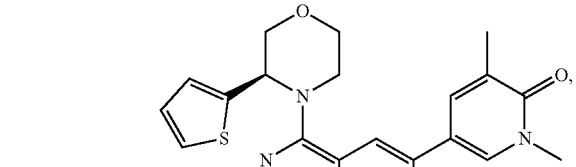
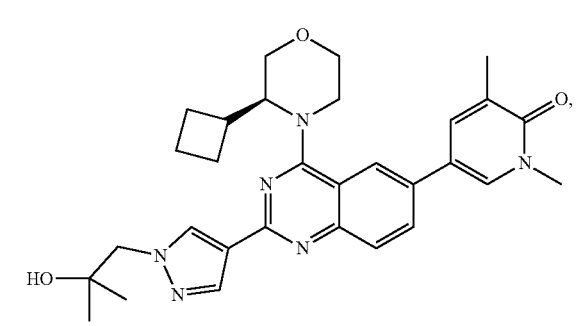
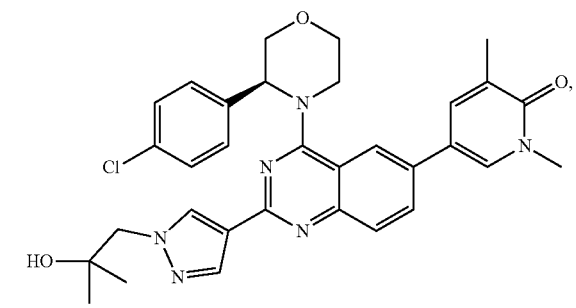
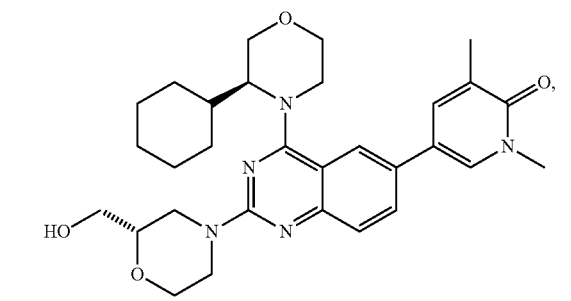
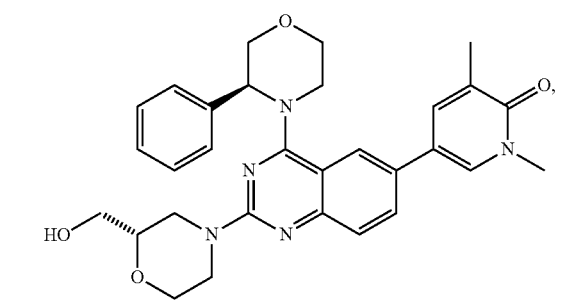

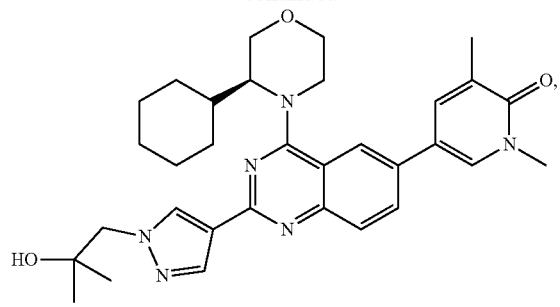
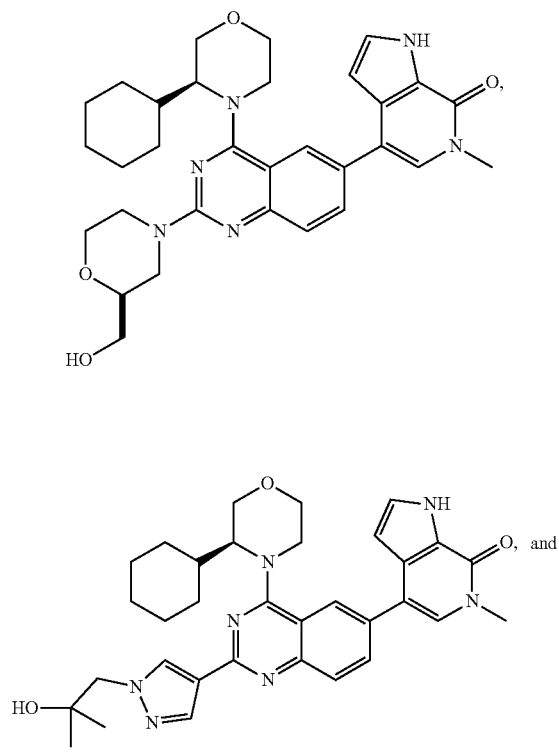
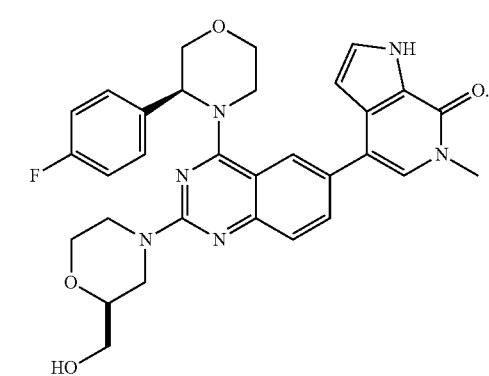
In an embodiment, the compound of Formula (I) is one of the following:
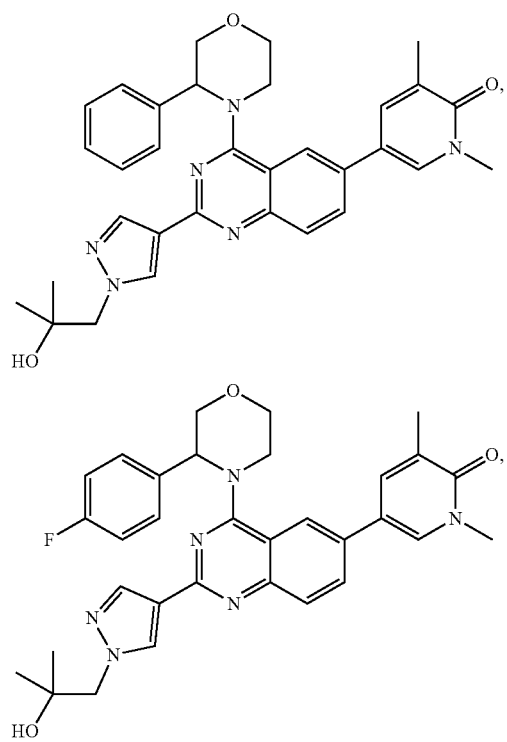
In an embodiment, the compound of Formula (I) is not any of the following:
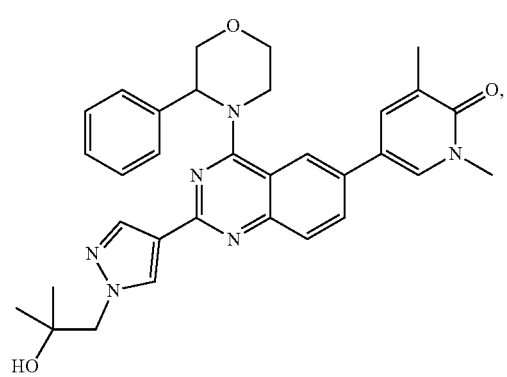

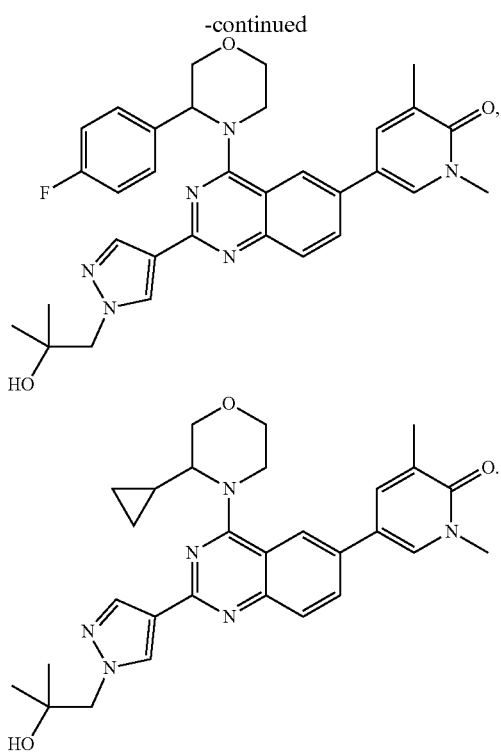

In another embodiment, the present invention provides for a compound of Formula (III):

Formula (III)

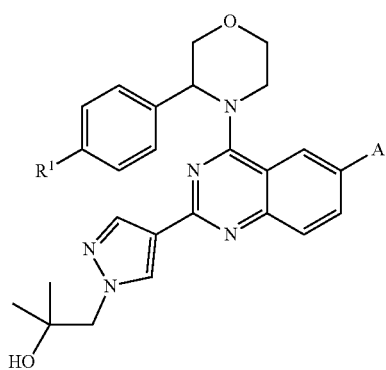

or a tautomer, optical- or stereo-isomer thereof, or a pharmaceutically acceptable salt thereof, wherein:

A is

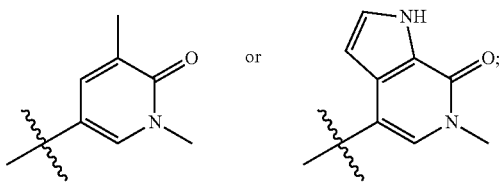

wherein
R¹ is H or halogen.

In an embodiment, the present invention provides for a compound of Formula (IIIa):

Formula (IIIa)

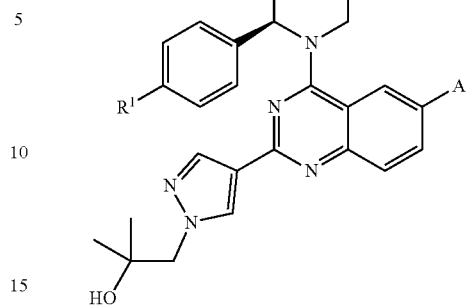

or a pharmaceutically acceptable salt thereof, wherein the R¹ and A substituents are as defined in Formula (III).

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements.

FIGS. 1(A) and (B) shows tumor volume and tumor weight of the mice for the Kasumi-1 xenograft results.

DETAILED DESCRIPTION

Certain of the compounds described herein contain one or more chiral centers (e.g., including the compound species of the examples unless otherwise indicated by the chemical name), or may otherwise be capable of existing as multiple stereoisomers. The scope of the present disclosure includes mixtures of stereoisomers as well as purified enantiomers or enantiomerically and/or diastereomerically enriched mixtures. In some embodiments, the compounds provided herein are present as the (S)-enantiomer. In some embodiments, the compounds provided herein are present as the (R)-enantiomer. Also included within the scope of the present disclosure are the individual stereoisomers of the compounds represented by Formula I, as well as any wholly or partially equilibrated mixtures thereof. The present disclosure also includes the individual stereoisomers of the compounds represented by the formulas above as mixtures with isomers thereof in which one or more chiral centers are inverted.

In some embodiments, compounds of the present invention are provided as pharmaceutically acceptable salts which include non-toxic salts of the compounds set forth herein. Examples of suitable pharmaceutically acceptable salts include inorganic acid addition salts such as chloride, bromide, sulfate, phosphate, and nitrate; organic acid addition salts such as acetate, galactarate, propionate, succinate, lactate, glycolate, malate, tartrate, citrate, maleate, fumarate, methanesulfonate, p-toluenesulfonate, and ascorbate; salts with acidic amino acid such as aspartate and glutamate; alkali metal salts such as sodium salt and potassium salt; alkaline earth metal salts such as magnesium salt and calcium salt; ammonium salt; organic basic salts such as trimethylamine salt, triethylamine salt, pyridine salt, picoline salt, dicyclohexylamine salt, and N,N'-dibenzylethylenediamine salt; and salts with basic amino acid such as lysine salt and arginine salt.

The salts provided may be in some cases hydrates or solvates. The present invention includes a salt or solvate of the compounds herein described, including combinations thereof such as a solvate of a salt. The compounds of the present disclosure may exist in solvated, for example hydrated or ethanol complexed, as well as un-solvated forms, and the present invention encompasses all such forms. The salts of the present disclosure can be pharmaceutically acceptable salts.

The compounds or their pharmaceutically acceptable salts as provided herein may crystallize in more than one form, a characteristic known as polymorphism, and such polymorphic forms ("polymorphs") are within the scope of the present disclosure. Polymorphism generally can occur as a response to changes in temperature, pressure, or both. Polymorphism can also result from variations in the crystallization process. Polymorphs can be distinguished by various physical characteristics known in the art such as x-ray diffraction patterns, solubility, and melting point.

Although it is possible to administer the compounds of the present disclosure in the form of a bulk active chemical, it is preferred to administer the compound in the form of a pharmaceutical composition or formulation. Thus, pharmaceutical compositions are provided that include one or more compounds of Formula I and/or pharmaceutically acceptable salts thereof and one or more pharmaceutically acceptable carriers, diluents, or excipients.

Further embodiments of the invention provide a process for the preparation of a pharmaceutical composition including admixing one or more compounds of Formula I and/or pharmaceutically acceptable salts thereof with one or more pharmaceutically acceptable carriers, diluents or excipients.

In some embodiments, compounds which bind to and otherwise modulate acetylated protein binding to bromodomain-containing proteins are provided. Such compounds include at least one compound selected from Formula I as provided herein. Exemplary compounds include, but are not limited to, those compounds set forth previously by name or structure.

In some embodiments, compounds for use in the treatment or prevention of a disease or condition mediated by inhibiting bromodomain-containing proteins from binding acetylated proteins are provided. In some embodiments, compounds for use in the treatment of a disease or condition mediated by inhibiting bromodomain-containing proteins from binding acetylated proteins are provided.

In some embodiments, a method for the treatment or prevention of a disease is provided that includes the step of administering a compound as provided herein to inhibit the activity of bromodomain-containing proteins.

In some embodiments, a method for the treatment or prevention of a disease is provided that includes the step of administering a compound as provided herein to inhibit the activity of bromodomain-containing proteins by inhibiting binding to acetylated proteins. In some embodiments, the method is a method of treating a disease which includes the step of administering a compound as provided herein to inhibit the activity of bromodomain-containing proteins by inhibiting binding to acetylated proteins.

In some embodiments, the use of a compound or salt thereof, for the preparation of a pharmaceutical composition for the treatment or prevention of a disease or condition mediated by inhibiting bromodomain-containing proteins by inhibiting binding to acetylated proteins is provided. In some embodiments, the use of a compound or salt thereof, for the preparation of a pharmaceutical composition for the treatment of a disease or condition mediated by inhibiting bromodomain-containing proteins by inhibiting binding to acetylated proteins is provided. In some embodiments, the acetylated protein is an acetylated histone.

In some embodiments, the acetylated protein is an acetylated histone involved in the regulation or dysregulation of gene expression.

The compounds of the present invention, their pharmaceutically acceptable salts and their pharmaceutical compositions can be used for treating or preventing a wide variety of conditions or disorders. In some embodiments, the compounds of the present invention their pharmaceutically acceptable salts and their pharmaceutical compositions can be used for treating a wide variety of conditions or disorders.

In some embodiments, the disease is selected from cancer, fibrosis, inflammation, or an inflammatory disorder.

In some embodiments, the disease is cancer. In some embodiments, the cancer is selected from human NUT midline carcinoma, multiple myeloma, Burkitt's lymphoma, myeloid leukemia, NPM1c mutant leukemia, T-cell lymphoblastic leukemia, hepatocellular carcinoma, glioblastoma, neuroblastoma, sarcoma, breast cancer, colorectal cancer, lung cancer, pancreatic cancer, neuroendocrine tumors, Merkel cell carcinoma, and prostate cancer. In some embodiments, the cancer is selected from Hodgkin Lymphoma, non-Hodgkin lymphoma, acute myeloid leukemia, chronic myeloid leukemia, and acute lymphocytic leukemia. In some embodiments, the cancer is associated with human T-cell leukemia virus, type 1 (HTLV-1), including adult T-cell leukemia/lymphoma (ATLL) or HTLV-1-associated myelopathy/tropical spastic paraparesis (HAM/TSP).

In some embodiments, the disease is fibrosis. In some embodiments, the fibrosis is selected from pulmonary fibrosis, idiopathic pulmonary fibrosis (IPF), renal fibrosis, intestinal fibrosis, hepatic fibrosis, and hepatic cirrhosis. In some embodiments, the disease is idiopathic pulmonary fibrosis (IPF). IPF is a devastating orphan lung disease that robs patients of their pulmonary function. This decline in breathing ability leads to greater than a 50% mortality within 2-3 years of diagnosis. This prognosis is even worse in moderate to severe patients that are rapidly progressing where there are no available treatments.

In some embodiments, the disease is inflammation or an inflammatory disorder. In some embodiments, the inflammation or inflammatory disorder is selected from allergy, asthma, an autoimmune disease, coeliac disease, glomerulonephritis, hepatitis, inflammatory bowel disease, reperfusion injury and transplant rejection, chronic peptic ulcer, tuberculosis, rheumatoid arthritis, periodontitis, ulcerative colitis, Crohn's disease, sinusitis, active hepatitis, atherosclerosis, periodontitis, juvenile rheumatoid arthritis, cystic fibrosis lung disease, Guillain-Barre syndrome, Graves' ophthalmopathy, and non alcoholic steatohepatitis (NASH). In some embodiments, the disease is inflammation. In some embodiments, the disease is an inflammatory disorder.

In some embodiments, the disease is an inflammation and/or fibrosis associated with acute radiation exposure. In some embodiments, the disease is an inflammation associated with acute radiation exposure. In some embodiments, the disease is fibrosis associated with acute radiation exposure. In some embodiments, the disease is inflammation and fibrosis associated with acute radiation exposure. In some embodiments, the disease is an inflammation and/or fibrosis associated with acute radiation exposure and the patient has been identified as having been exposed to abnormally high levels of radiation (e.g., a nuclear accident victim).

In some embodiments, the method provided herein is a method of treating the disease. In some embodiments, the method provided herein is a method of preventing the disease.

The manner in which the compounds or their pharmaceutical composition set forth herein may be administered can vary. In some embodiments, the compounds can be administered orally. Preferred pharmaceutical compositions may be formulated for oral administration in the form of tablets, capsules, caplets, syrups, solutions, and suspensions. Such oral formulations can be provided in modified release dosage forms such as time-release tablet and capsule formulations. Pharmaceutical compositions can also be administered via parenteral administration/injection, namely, intravenously, intramuscularly, subcutaneously, intraperitoneally, intraarterially, intrathecally, and intracerebroventricularly. Intravenous administration is a preferred method of injection. Suitable carriers for injection are well known to those of skill in the art and include 5% dextrose solutions, saline, and phosphate buffered saline.

Pharmaceutical compositions may also be administered using other means, for example, rectal administration. Formulations useful for rectal administration, such as suppositories, are well known to those of skill in the art.

The compounds can also be administered by inhaled delivery or other direct application to the affected tissue, for example, in the form of oral pulmonary or intranasal inhalation delivery or nebulized inhalation delivery, comprising formulations for aerosol administration, for example, via a nebulizer, dry powder inhalation (DPI), pressurized metered-dose inhaler (MDI), etc, and methods of using the nebulizer, DPI, MDI, etc. by administering the compounds discussed herein with a nebulizer, a DPI, or a MDI, etc, as well as dosing regimens, which are discussed in US 2015/0044288 and AU 2018206852 (which claims priority to U.S. 61/675,286, U.S. 61/756,983, and U.S. 61/824,818), the content of which are incorporated herein by reference in its entirety. The compound can also be administered topically, such as, in lotion form; transdermally, such as, using a transdermal patch (for example, by using technology that is commercially available from Novartis and Alza Corporation); by powder injection; or by buccal, sublingual, or intranasal absorption. Pharmaceutical compositions may be formulated in unit dose form, or in multiple or subunit doses.

The administration of the pharmaceutical compositions described herein can be intermittent, or at a gradual, continuous, constant or controlled rate. The pharmaceutical compositions may be administered to a subject In addition, the time of day and the number of times per day that the pharmaceutical composition is administered can vary.

A further object of the disclosure is a kit, comprising a composition containing at least one compound disclosed herein for treatment and prevention of disease or disease related morbidities. The composition of the kit may comprise at least one carrier, at least one binder, at least one diluent, at least one excipient, at least one other therapeutic agent, or mixtures thereof.

The compounds as provided herein may also be used for the preparation of a medicament for the treatment or prevention of a disease or condition characterized by bromodomain-containing proteins binding acetylated proteins and altering normal gene expression. In some embodiments, the compounds as provided herein may be used for the preparation of a medicament for the treatment of a disease or condition characterized by bromodomain-containing proteins binding acetylated proteins and altering normal gene expression. Methods for treating, preventing, delaying the onset of, or slowing the progression of disorders mediated by acetylated proteins involved in the regulation or dysregulation of gene expression, in a subject in need of such treatment are also provided. The methods involve administering to a subject a therapeutically effective amount of a compound as provided herein, including a salt thereof, or a pharmaceutical composition that includes such compounds.

In some embodiments, the methods for treating, preventing, delaying the onset of, or slowing the progression of disorders mediated by acetylated proteins involved in the regulation or dysregulation of gene expression, in a subject in need of such treatment include the administration of at least one compound as provided herein including, but not limited to, the compounds provided according to Formula I, Formula II, Formula III, and Formula III(a).

The compounds alone or in a pharmaceutical composition as provided herein may be used in the treatment of a variety of disorders and conditions and, as such, may be used in combination with a variety of other suitable therapeutic agents useful in the treatment or prophylaxis of those disorders or conditions. Thus, in some embodiments, the present disclosure includes the administration of the compound of the present disclosure in combination with other therapeutic compounds. Such a combination of pharmaceutically active agents may be administered together or separately and, when administered separately, administration may occur simultaneously or sequentially, in any order. The amounts of the compounds or agents and the relative timings of administration will be selected in order to achieve the desired therapeutic effect. The administration in combination of a compound of the present disclosure with other treatment agents may be in combination by administration concomitantly in: (1) a unitary pharmaceutical composition including two or more compounds; or (2) separate pharmaceutical compositions each including one of the compounds. Alternatively, the combination may be administered separately in a sequential manner wherein one treatment agent is administered first and the other second. Such sequential administration may be close in time or remote in time.

In some embodiments, the present disclosure includes combination therapy comprising administering to the subject a therapeutically or prophylactically effective amount of the compound of the present disclosure and one or more other therapy including chemotherapy, radiation therapy, gene therapy, or immunotherapy.

It is contemplated and therefore within the scope of the present invention that any feature that is described above can be combined with any other feature that is described above.

It is also contemplated and therefore within the scope of the present invention that negative provisos can be added to exclude any compound or remove any feature.

As used herein the term "halogen" refers to fluoro, chloro, bromo, or iodo.

As used herein, the terms "effective amount", "therapeutic amount", and "effective dose" refer to an amount of the compound of the present disclosure sufficient to elicit the desired pharmacological or therapeutic effects, thus resulting in an effective prevention or treatment of a disorder. Treatment of a disorder may be manifested by delaying or preventing the onset or progression of the disorder, as well as the onset or progression of symptoms associated with the disorder. Treatment of a disorder may also be manifested by a decrease or elimination of symptoms, reversal of the progression of the disorder, as well as any other contribution to the well-being of the patient. The effective dose can vary, depending upon factors such as the condition of the patient, the severity of the symptoms of the disorder, and the manner in which the pharmaceutical composition is administered.

As used herein, the term "pharmaceutically acceptable" refers to carrier(s), diluent(s), excipient(s) or salt forms of the compounds of the present disclosure that are compatible with the other ingredients of the formulation of the pharmaceutical composition.

As used herein, the term "pharmaceutical composition" refers to a compound of the present disclosure optionally admixed with one or more pharmaceutically acceptable carriers, diluents, or excipients. Pharmaceutical compositions preferably exhibit a degree of stability to environmental conditions so as to make them suitable for manufacturing and commercialization purposes.

As used herein, "treating" means administering to a subject a compound of the present disclosure or a pharmaceutical composition to ameliorate, reduce or lessen the symptoms of a disease. As used herein, "treating" or "treat" describes the management and care of a subject for the purpose of combating a disease, condition, or disorder and includes the administration of a compound disclosed herein, or a pharmaceutically acceptable salt, to alleviate the symptoms or complications of a disease, condition or disorder, or to eliminate the disease, condition or disorder. As used herein, "preventing" means administering to a subject a compound of the present disclosure to pharmaceutical composition to keep the disease from occurring or to delay the onset of a disease. The term "treat" may also include treatment of a cell in vitro or an animal model.

As used herein, "subject" or "subjects" refers to any animal, such as a warm-blooded animal, i.e., mammals including rodents (e.g., mice or rats), dogs, primates, lemurs or humans.

Additional methods and materials can be found, for example, in U.S. Patent Publication No. 2018/0305344, the disclosure of which is incorporated herein by reference in its entirety.

EXAMPLES

Exemplary compounds of Formula (I) and corresponding assay data are provided below.

TABLE 1

Structure and compound name of examples.

| Cpd. | Structure | Compound Name |
|---|---|---|
| 1 | | (S)-5-(2-(1-(2-hydroxy-2-methylpropyl)-1H-pyrazol-4-yl)-4-(3-phenylmorpholino)quinazolin-6-yl)-1,3-dimethylpyridin-2(1H)-one |
| 2 | | (S)-4-(2-(1-(2-hydroxy-2-methylpropyl)-1H-pyrazol-4-yl)-4-(3-phenylmorpholino)quinazolin-6-yl)-6-methyl-1,6-dihydro-7H-pyrrolo[2,3-c]pyridin-7-one |
| 3 | | (S)-5-(4-(3-cyclopropylmorpholino)-2-(1-(2-hydroxy-2-methylpropyl)-1H-pyrazol-4-yl)quinazolin-6-yl)-1,3-dimethylpyridin-2(1H)-one |

TABLE 1-continued

Structure and compound name of examples.

| Cpd. | Structure | Compound Name |
|---|---|---|
| 4 | | (S)-4-(4-(3-cyclopropylmorpholino)-2-(1-(2-hydroxy-2-methylpropyl)-1H-pyrazol-4-yl)quinazolin-6-yl)-6-methyl-1,6-dihydro-7H-pyrrolo[2,3-c]pyridin-7-one |
| 5 | | (S)-4-(4-(3-(4-fluorophenyl)morpholino)-2-(1-(2-hydroxy-2-methylpropyl)-1H-pyrazol-4-yl)quinazolin-6-yl)-6-methyl-1,6-dihydro-7H-pyrrolo[2,3-c]pyridin-7-one |
| 6 | | (S)-5-(4-(3-(4-fluorophenyl)morpholino)-2-(1-(2-hydroxy-2-methylpropyl)-1H-pyrazol-4-yl)quinazolin-6-yl)-1,3-dimethylpyridin-2(1H)-one |
| 7 | | (R)-5-(2-(1-(2-hydroxy-2-methylpropyl)-1H-pyrazol-4-yl)-4-(3-(thiophen-2-yl)morpholino)quinazolin-6-yl)-1,3-dimethylpyridin-2(1H)-one |

TABLE 1-continued

Structure and compound name of examples.

| Cpd. | Structure | Compound Name |
|---|---|---|
| 8 | | (S)-5-(4-(3-cyclobutylmorpholino)-2-(1-(2-hydroxy-2-methylpropyl)-1H-pyrazol-4-yl)quinazolin-6-yl)-1,3-dimethylpyridin-2(1H)-one |
| 9 | | (S)-5-(4-(3-(4-chlorophenyl)morpholino)-2-(1-(2-hydroxy-2-methylpropyl)-1H-pyrazol-4-yl)quinazolin-6-yl)-1,3-dimethylpyridin-2(1H)-one |
| 10 | | 5-(4-((S)-3-cyclohexylmorpholino)-2-((S)-2-(hydroxymethyl)morpholino)quinazolin-6-yl)-1,3-dimethylpyridin-2(1H)-one |
| 11 | | 5-(2-((S)-2-(hydroxymethyl)morpholino)-4-((S)-3-phenylmorpholino)quinazolin-6-yl)-1,3-dimethylpyridin-2(1H)-one |

TABLE 1-continued

Structure and compound name of examples.

| Cpd. | Structure | Compound Name |
|---|---|---|
| 12 | | (S)-5-(4-(3-cyclohexylmorpholino)-2-(1-(2-hydroxy-2-methylpropyl)-1H-pyrazol-4-yl)quinazolin-6-yl)-1,3-dimethylpyridin-2(1H)-one |
| 13 | | 4-(4-((S)-3-cyclohexylmorpholino)-2-((S)-2-(hydroxymethyl)morpholino)quinazolin-6-yl)-6-methyl-1,6-dihydro-7H-pyrrolo[2,3-c]pyridin-7-one |
| 14 | | (S)-4-(4-(3-cyclohexylmorpholino)-2-(1-(2-hydroxy-2-methylpropyl)-1H-pyrazol-4-yl)quinazolin-6-yl)-6-methyl-1,6-dihydro-7H-pyrrolo[2,3-c]pyridin-7-one |
| 15 | | 4-(4-((S)-3-(4-fluorophenyl)morpholino)-2-((S)-2-(hydroxymethyl)morpholino)quinazolin-6-yl)-6-methyl-1,6-dihydro-7H-pyrrolo[2,3-c]pyridin-7-one |

Synthetic Procedures for Examples 1-15.

General Methods: All air or moisture sensitive reactions were performed under positive pressure of nitrogen with oven-dried glassware. Chemical reagents and anhydrous solvents were obtained from commercial sources and used as-is. Preparative purification was performed on a Waters semi-preparative HPLC. The column used was a Phenomenex Luna C18 (5 micron, 30×75 mm) at a flow rate of 45 mL/min. The mobile phase consisted of acetonitrile and water (each containing 0.1% trifluoroacetic acid). A gradient of 10% to 50% acetonitrile over 8 minutes was used during the purification. Fraction collection was triggered by UV detection (220 nm). Analytical analysis for purity was determined by two different methods denoted as Final QC Methods 1 and 2. Method 1: Analysis was performed on an Agilent 1290 Infinity Series HPLC. UHPLC Long Gradient Equivalent 4% to 100% acetonitrile (0.05% trifluoroacetic acid) in water over 3 minutes run time of 4.5 minutes with a flow rate of 0.8 mL/min. A Phenomenex Luna C18 column (3 micron, 3×75 mm) was used at a temperature of 50° C. Method 2: analysis was performed on an Agilent 1260 with a 7 minute gradient of 4% to 100% acetonitrile (containing 0.025% trifluoroacetic acid) in water (containing 0.05% trifluoroacetic acid) over 8 minute run time at a flow rate of 1 mL/min. A Phenomenex Luna C18 column (3 micron, 3×75 mm) was used at a temperature of 50° C. Purity determination was performed using an Agilent Diode Array Detector for both Method 1 and Method 2. Mass determination was performed using an Agilent 6130 mass spectrometer with electrospray ionization in the positive mode. All of the analogs for assay have purity greater than 95% based on both analytical methods. $^1$H spectra were recorded on Varian 400 (100) and 600 MHz spectrometers. High resolution mass spectrometry was recorded on Agilent 6210 Time-of-Flight LC/MS system.

Example 1. (S)-5-(2-(1-(2-hydroxy-2-methylpropyl)-1H-pyrazol-4-yl)-4-(3-phenylmorpholino)quinazolin-6-yl)-1,3-dimethylpyridin-2(1H)-one (Cpd. 1)

in THF (50 ml) was added triethylamine (4.55 g, 45.0 mmol) at rt. The mixture was stirred at rt for 4 hr. The mixture was poured into EtOAc/H$_2$O (100 mL/100 mL). The organic layer was dried (Na$_2$SO$_4$) and filtered. After removal of solvent the product was purified by silica gel chromatography using 20-50% EtOAc/hexane as the eluent to give (S)-4-(6-bromo-2-chloroquinazolin-4-yl)-3-phenylmorpholine (8.8 g, 21.74 mmol, 72.5% yield). LC-MS (Method 1): $t_R$=3.70 min, m/z (M+H)$^+$=406.

Step 2. Synthesis of (S)-5-(2-chloro-4-(3-phenylmorpholino)quinazolin-6-yl)-1,3-dimethylpyridin-2(1H)-one In a 2-neck flask was placed (S)-4-(6-bromo-2-chloroquinazolin-4-yl)-3-phenylmorpholine (1619 mg, 4 mmol), 1,3-dimethyl-5-(4,4,5,5-tetramethyl-1,3,2-dioxaborolan-2-yl)pyridin-2(1H)-one (1096 mg, 4.40 mmol), PdCl$_2$(dppf)-CH$_2$Cl$_2$ adduct (327 mg, 0.400 mmol), and potassium carbonate (1824 mg, 13.20 mmol). The air was removed and re-filled with N$_2$ (3 times). Then, 1,4-dioxane (12 ml)/water (6 ml) was added and heated at 70° C. for 1.5 hr. After cooling to rt, the layer was separated and the aqueous layer was extracted with EtOAc (10 mL×2). The combined organic layer was dried (Na$_2$SO$_4$) and filtered. After removal of solvent, the product was purified by silica gel chromatography using 0-5-10% MeOH/CH$_2$Cl$_2$ as the eluent to give (S)-5-(2-chloro-4-(3-phenylmorpholino)quinazolin-6-yl)-1,

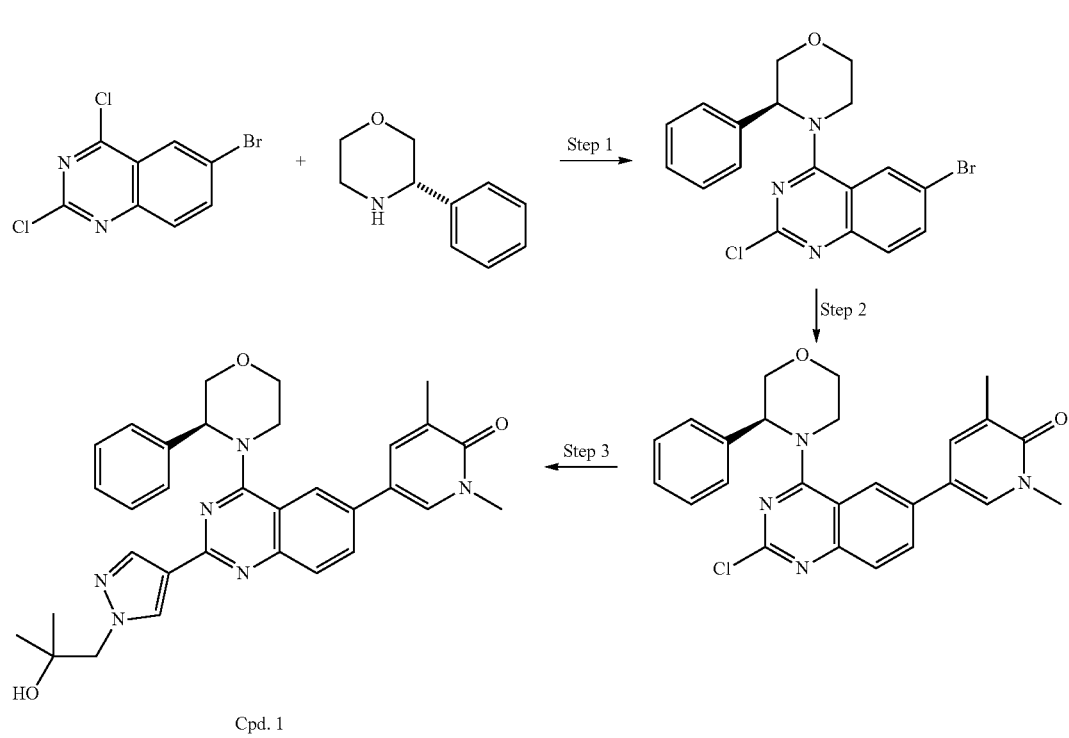

Cpd. 1

Step 1: Synthesis of (S)-4-(6-bromo-2-chloroquinazolin-4-yl)-3-phenylmorpholine

To a mixture of 6-bromo-2,4-dichloroquinazoline (8.34 g, 30 mmol) and (S)-3-phenylmorpholine (5.14 g, 31.5 mmol)

3-dimethylpyridin-2(1H)-one (1505 mg, 3.37 mmol, 84% yield). $^1$H NMR (400 MHz, DMSO-d$_6$) δ 8.01 (dd, J=8.8, 1.9 Hz, 1H), 7.84 (d, J=2.6 Hz, 1H), 7.75 (d, J=1.9 Hz, 1H), 7.73 (d, J=8.8 Hz, 1H), 7.59 (d, J=7.7 Hz, 2H), 7.45 (t, J=7.6 Hz, 2H), 7.35 (t, J=7.3 Hz, 1H), 7.14 (s, 1H), 5.63 (s, 1H), 4.45 (d, J=13.3 Hz, 1H), 4.39-4.27 (m, 1H), 3.97-3.90 (m, 2H), 3.72 (td, J=10.9, 2.4 Hz, 1H), 3.63 (t, J=12.0 Hz, 1H), 3.41 (s, 3H), 1.91 (s, 3H); LC-MS (Method 1): $t_R$=3.34 min, m/z (M+H)$^+$=447.

Step 3. Synthesis of (S)-5-(2-(1-(2-hydroxy-2-methylpropyl)-1H-pyrazol-4-yl)-4-(3-phenylmorpholino)quinazolin-6-yl)-1,3-dimethylpyridin-2(1H)-one (Cpd. 1)

In a microwave tube was placed (S)-5-(2-chloro-4-(3-phenylmorpholino)quinazolin-6-yl)-1,3-dimethylpyridin-2(1H)-one (1500 mg, 3.36 mmol), 2-methyl-1-(4-(4,4,5,5-tetramethyl-1,3,2-dioxaborolan-2-yl)-1H-pyrazol-1-yl)propan-2-ol (1340 mg, 5.03 mmol), PdCl$_2$(dppf)-CH$_2$Cl$_2$ adduct (274 mg, 0.336 mmol), and K$_2$CO$_3$ (2087 mg, 15.10 mmol). The air was removed and re-filled with N$_2$ (3 times). Then, 1,4-dioxane (12 ml)/water (6 ml) was added and heated at 90° C. for 1.5 hr. After cooling to rt, the layer was separated and the aqueous layer was extracted with EtOAc (2 mL×2). The combined organic layer was dried (Na$_2$SO$_4$) and filtered through PL-Thiol MP resin and then eluted with EtOAc/MeOH. After removal of solvent, the product was purified by silica gel chromatography using 0-10% MeOH/EtOAc as the eluent and a second column using 0-10% MeOH/CH$_2$Cl$_2$ to give (S)-5-(2-(1-(2-hydroxy-2-methylpropyl)-1H-pyrazol-4-yl)-4-(3-phenylmorpholino)quinazolin-6-yl)-1,3-dimethylpyridin-2(1H)-one (1293 mg, 2.348 mmol, 70.0% yield). $^1$H NMR (400 MHz, DMSO-d$_6$) δ 8.24 (s, 1H), 7.98-7.93 (m, 3H), 7.90 (d, J=2.0 Hz, 1H), 7.76 (d, J=8.8 Hz, 1H), 7.57 (d, J=7.6 Hz, 2H), 7.41 (d, J=2.4 Hz, 1H), 7.34 (t, J=7.6 Hz, 2H), 7.22 (t, J=7.4 Hz, 1H), 5.34 (t, J=4.5 Hz, 1H), 4.74 (s, 1H), 4.05 (s, 2H), 4.14-3.96 (m, 3H), 3.93-3.83 (m, 2H), 3.78-3.66 (m, 1H), 3.46 (s, 3H), 1.98 (s, 3H), 1.07 (s, 6H); LC-MS (Method 2): $t_R$=4.25 min, m/z (M+H)$^+$=551.

Example 2. (S)-4-(2-(1-(2-hydroxy-2-methylpropyl)-1H-pyrazol-4-yl)-4-(3-phenylmorpholino)quinazolin-6-yl)-6-methyl-1,6-dihydro-7H-pyrrolo[2,3-c]pyridin-7-one (Cpd. 2)

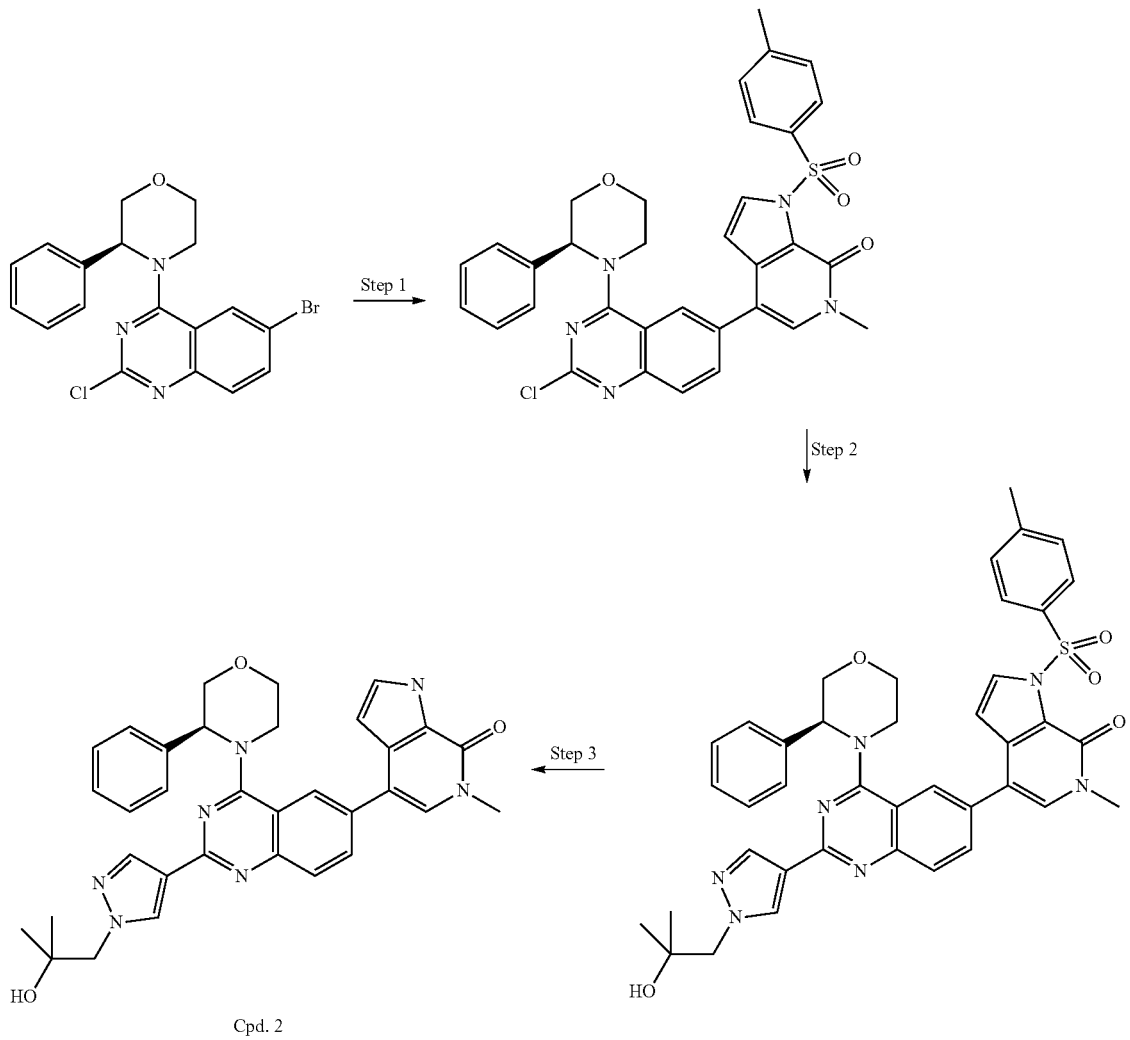 [SMILES: Clc1nc(N2CCOC[C@@H]2c2ccccc2)c2cc(Br)ccc2n1 ; Cc1ccc(S(=O)(=O)n2ccc3c(-c4ccc5nc(Cl)nc(N6CCOC[C@@H]6c6ccccc6)c5c4)cn(C)c(=O)c32)cc1 ; Cn1cc(-c2ccc3nc(-c4cnn(CC(C)(C)O)c4)nc(N4CCOC[C@@H]4c4ccccc4)c3c2)c2cc[nH]c2c1=O ; Cc1ccc(S(=O)(=O)n2ccc3c(-c4ccc5nc(-c6cnn(CC(C)(C)O)c6)nc(N6CCOC[C@@H]6c6ccccc6)c5c4)cn(C)c(=O)c32)cc1]

Step 1. Synthesis of (S)-4-(2-chloro-4-(3-phenylmorpholino)quinazolin-6-yl)-6-methyl-1-tosyl-1,6-dihydro-7H-pyrrolo[2,3-c]pyridin-7-one In a 2-neck flask was placed (S)-4-(6-bromo-2-chloroquinazolin-4-yl)-3-phenylmorpholine (2.428 g, 6 mmol), 6-methyl-4-(4,4,5,5-tetramethyl-1,3,2-dioxaborolan-2-yl)-1-tosyl-1,6-dihydro-7H-pyrrolo[2,3-c]pyridin-7-one (2.83 g, 6.60 mmol), PdCl$_2$(dppf)-CH$_2$Cl$_2$ adduct (0.49 g, 0.60 mmol), and potassium carbonate (2.74 g, 19.80 mmol). The air was removed and re-filled with N$_2$ (3 times). Then, 1,4-Dioxane (24 ml)/Water (10 ml) was added and heated at 70° C. for 1.5 hr. After cooling to rt, the layer was separated and the aqueous layer was extracted with EtOAc (10 mL×2). The combined organic layer was dried (Na$_2$SO$_4$) and filtered. After removal of solvent, the product was purified by silica gel chromatography using 20-90% EtOAc/hexane as the eluent to give (S)-4-(2-chloro-4-(3-phenylmorpholino)quinazolin-6-yl)-6-methyl-1-tosyl-1,6-dihydro-7H-pyrrolo[2,3-c]pyridin-7-one (3.412 g, 5.45 mmol, 91% yield). $^1$H NMR (400 MHz, DMSO-d$_6$) δ 7.94 (dd, J=8.6, 1.8 Hz, 1H), 7.91-7.86 (m, 3H), 7.82 (s, 1H), 7.80 (d, J=8.7 Hz, 1H), 7.52 (d, J=7.7 Hz, 2H), 7.48 (s, 1H), 7.44-7.33 (m, 4H), 7.27 (t, J=7.3 Hz, 1H), 6.51 (d, J=3.5 Hz, 1H), 5.66 (s, 1H), 4.44-4.31 (m, 2H), 3.91 (dd, J=12.3, 3.7 Hz, 1H), 3.88-3.81 (m, 1H), 3.72 (td, J=11.0, 2.5 Hz, 1H), 3.59 (t, J=12.4 Hz, 1H), 3.37 (s, 3H), 2.36 (s, 3H); LC-MS (Method 1): t$_R$=3.67 min, m/z (M+H)$^+$=626.

Step 2. Synthesis of (S)-4-(2-(1-(2-hydroxy-2-methylpropyl)-1H-pyrazol-4-yl)-4-(3-phenylmorpholino)quinazolin-6-yl)-6-methyl-1-tosyl-1,6-dihydro-7H-pyrrolo[2,3-c]pyridin-7-one In a microwave tube was placed (S)-4-(2-chloro-4-(3-phenylmorpholino)quinazolin-6-yl)-6-methyl-1-tosyl-1,6-dihydro-7H-pyrrolo[2,3-c]pyridin-7-one (3412 mg, 5.45 mmol), 2-methyl-1-(4-(4,4,5,5-tetramethyl-1,3,2-dioxaborolan-2-yl)-1H-pyrazol-1-yl)propan-2-ol (1741 mg, 6.54 mmol), PdCl$_2$(dppf)-CH$_2$Cl$_2$ adduct (445 mg, 0.545 mmol), and K$_2$CO$_3$ (2712 mg, 19.62 mmol). The air was removed and re-filled with N$_2$ (3 times). Then, 1,4-Dioxane (20 ml)/Water (10 ml) was added and heated at 90° C. for 1.5 hr. After cooling to rt, the layer was separated and the aqueous layer was extracted with EtOAc (2 mL×2). The combined organic layer was dried (Na$_2$SO$_4$) and filtered through PL-Thiol MP resin and then eluted with EtOAc/MeOH. After removal of solvent, the product was purified by silica gel chromatography using 0-10% MeOH/EtOAc as the eluent to give (S)-4-(2-(1-(2-hydroxy-2-methylpropyl)-1H-pyrazol-4-yl)-4-(3-phenylmorpholino)quinazolin-6-yl)-6-methyl-1-tosyl-1,6-dihydro-7H-pyrrolo[2,3-c]pyridin-7-one (3111 mg, 4.26 mmol, 78% yield). $^1$H NMR (400 MHz, DMSO-d$_6$) δ 8.25 (s, 1H), 7.99-7.94 (m, 3H), 7.92 (d, J=8.2 Hz, 2H), 7.88 (dd, J=8.6, 1.8 Hz, 1H), 7.82 (d, J=8.7 Hz, 1H), 7.59 (s, 1H), 7.52 (d, J=7.6 Hz, 2H), 7.42 (d, J=8.1 Hz, 2H), 7.28 (t, J=7.6 Hz, 2H), 7.17 (t, J=7.4 Hz, 1H), 6.61 (d, J=3.5 Hz, 1H), 5.35 (t, J=4.5 Hz, 1H), 4.73 (s, 1H), 4.06 (s, 2H), 4.11-3.81 (m, 5H), 3.78-3.66 (m, 1H), 3.43 (s, 3H), 2.37 (s, 3H), 1.07 (s, 6H); LC-MS (Method 1): t$_R$=3.08 min, m/z (M+H)$^+$=730.

Step 3. Synthesis of (S)-4-(2-(1-(2-hydroxy-2-methylpropyl)-1H-pyrazol-4-yl)-4-(3-phenylmorpholino)quinazolin-6-yl)-6-methyl-1,6-dihydro-7H-pyrrolo[2,3-c]pyridin-7-one (Cpd. 2)

To a solution of (S)-4-(2-(1-(2-hydroxy-2-methylpropyl)-1H-pyrazol-4-yl)-4-(3-phenylmorpholino)quinazolin-6-yl)-6-methyl-1-tosyl-1,6-dihydro-7H-pyrrolo[2,3-c]pyridin-7-one (3111 mg, 4.26 mmol) in THF (22 ml) was added NaOH$_{(aq)}$ (1 M, 21.3 mmol, 21.3 mL, 5 equiv). The mixture was sealed and then heated to 75° C. for 36 hr (complete and no side product). The layer was separated and the aqueous layer was extracted with EtOAc (5 mL×5). The combined organic was dried, filtered, and concentrated. After removal of solvent, the product was purified by silica gel chromatography using 0-5-10% MeOH/EtOAc as the eluent to give (S)-4-(2-(1-(2-hydroxy-2-methylpropyl)-1H-pyrazol-4-yl)-4-(3-phenylmorpholino)quinazolin-6-yl)-6-methyl-1,6-dihydro-7H-pyrrolo[2,3-c]pyridin-7-one (2026 mg, 3.52 mmol, 83% yield). $^1$H NMR (400 MHz, DMSO-d$_6$) δ 12.16 (s, 1H), 8.24 (s, 1H), 8.10 (d, J=2.0 Hz, 1H), 8.00 (dd, J=8.8, 1.9 Hz, 1H), 7.96 (s, 1H), 7.83 (d, J=8.7 Hz, 1H), 7.52 (d, J=7.6 Hz, 2H), 7.39 (s, 1H), 7.31 (d, J=2.6 Hz, 1H), 7.26 (t, J=7.6 Hz, 2H), 7.15 (t, J=7.4 Hz, 1H), 6.39 (t, J=2.2 Hz, 1H), 5.32 (t, J=4.7 Hz, 1H), 4.73 (s, 1H), 4.06 (s, 2H), 4.03 (d, J=5.7 Hz, 1H), 3.97-3.68 (m, 5H), 3.54 (s, 3H), 1.07 (s, 6H); LC-MS (Method 2): t$_R$=4.18 min, m/z (M+H)$^+$=576.

Example 3. (S)-5-(4-(3-cyclopropylmorpholino)-2-(1-(2-hydroxy-2-methylpropyl)-1H-pyrazol-4-yl)quinazolin-6-yl)-1,3-dimethylpyridin-2(1H)-one (Cpd. 3)

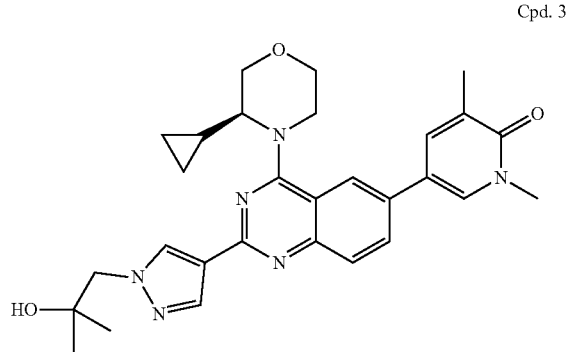 [SMILES: Cc1cc(-c2ccc3nc(-c4cnn(CC(C)(C)O)c4)nc(N4CCOC[C@@H]4C4CC4)c3c2)cn(C)c1=O]

Cpd. 3

The title compound was prepared from 6-bromo-2,4-dichloroquinazoline and (S)-3-cyclopropylmorpholine following the similar procedure as described in Example 1. $^1$H NMR (400 MHz, DMSO-d$_6$) δ 8.25 (s, 1H), 8.05 (d, J=2.6 Hz, 1H), 8.01 (s, 1H), 7.94 (dd, J=8.8, 1.9 Hz, 1H), 7.87 (d, J=2.0 Hz, 1H), 7.78 (d, J=2.5 Hz, 1H), 7.75 (d, J=8.7 Hz, 1H), 4.73 (s, 1H), 4.06 (s, 2H), 3.98-3.83 (m, 6H), 3.72-3.58 (m, 1H), 3.52 (s, 3H), 2.09 (s, 3H), 1.62-1.58 (m, 1H), 1.07 (s, 6H), 0.49-0.36 (m, 1H), 0.36-0.23 (m, 2H), −0.21--0.25 (m, 1H); LC-MS (Method 2): t$_R$=4.00 min, m/z (M+H)$^+$=515.

Example 4. (S)-4-(4-(3-cyclopropylmorpholino)-2-(1-(2-hydroxy-2-methylpropyl)-1H-pyrazol-4-yl)quinazolin-6-yl)-6-methyl-1,6-dihydro-7H-pyrrolo[2,3-c]pyridin-7-one (Cpd. 4)

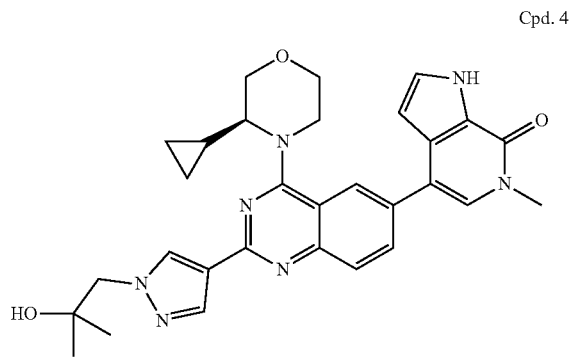 [SMILES: Cn1cc(-c2ccc3nc(-c4cnn(CC(C)(C)O)c4)nc(N4CCOC[C@@H]4C4CC4)c3c2)c2cc[nH]c2c1=O]

Cpd. 4

The title compound was prepared from 6-bromo-2,4-dichloroquinazoline and (S)-3-cyclopropylmorpholine following the similar procedure as described in Example 2. $^1$H NMR (400 MHz, DMSO-$d_6$) δ 12.19 (s, 1H), 8.27 (s, 1H), 8.02 (s, 1H), 7.99 (d, J=1.9 Hz, 1H), 7.95 (dd, J=8.7, 1.8 Hz, 1H), 7.80 (d, J=8.6 Hz, 1H), 7.49 (s, 1H), 7.38 (t, J=2.6 Hz, 1H), 6.42 (t, J=2.2 Hz, 1H), 4.74 (s, 1H), 4.07 (s, 2H), 3.99-3.80 (m, 6H), 3.70-3.60 (m, 1H), 3.58 (s, 3H), 1.61-1.59 (m, 1H), 1.08 (m, 6H), 0.47-0.43 (m, 1H), 0.37-0.24 (m, 2H), −0.14--0.17 (m, 1H); LC-MS (Method 2): $t_R$=3.99 min, m/z (M+H)$^+$=540.

Example 5. (S)-4-(4-(3-(4-fluorophenyl)morpholino)-2-(1-(2-hydroxy-2-methylpropyl)-1H-pyrazol-4-yl)quinazolin-6-yl)-6-methyl-1,6-dihydro-7H-pyrrolo[2,3-c]pyridin-7-one (Cpd. 5)

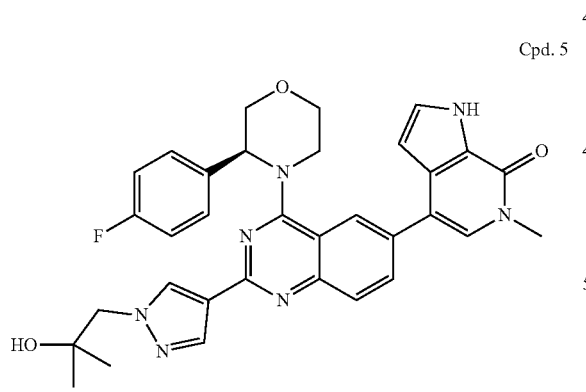

Cpd. 5

The title compound was prepared from 6-bromo-2,4-dichloroquinazoline and (S)-3-(4-fluorophenyl)morpholine following the similar procedure as described in Example 2. $^1$H NMR (400 MHz, DMSO-$d_6$) δ 12.17 (s, 1H), 8.24 (d, J=2.9 Hz, 1H), 8.11 (d, J=2.5 Hz, 1H), 8.00 (dt, J=8.7, 2.6 Hz, 1H), 7.97 (d, J=2.9 Hz, 1H), 7.83 (dd, J=8.7, 2.9 Hz, 1H), 7.57-7.53 (m, 2H), 7.44 (d, J=2.9 Hz, 1H), 7.32 (q, J=2.9 Hz, 1H), 7.07 (td, J=8.8, 2.9 Hz, 2H), 6.40-6.38 (m, 1H), 5.28 (p, J=3.3 Hz, 1H), 4.74 (d, J=2.9 Hz, 1H), 4.06 (d, J=2.9 Hz, 2H), 4.05-3.89 (m, 4H), 3.77-3.74 (m, 2H), 3.56 (s, 3H), 1.08 (s, 6H); LC-MS (Method 2): $t_R$=4.20 min, m/z (M+H)$^+$=594.

Example 6. (S)-5-(4-(3-(4-fluorophenyl)morpholino)-2-(1-(2-hydroxy-2-methylpropyl)-1H-pyrazol-4-yl)quinazolin-6-yl)-1,3-dimethylpyridin-2(1H)-one (Cpd. 6)

Cpd. 6

The title compound was prepared from 6-bromo-2,4-dichloroquinazoline and (S)-3-(4-fluorophenyl)morpholine following the similar procedure as described in Example 1. $^1$H NMR (400 MHz, DMSO-$d_6$) δ 8.23 (s, 1H), 8.02-7.94 (m, 3H), 7.91 (d, J=2.0 Hz, 1H), 7.77 (d, J=8.7 Hz, 1H), 7.60 (dd, J=8.5, 5.5 Hz, 2H), 7.48 (s, 1H), 7.14 (t, J=8.7 Hz, 2H), 5.30 (t, J=4.7 Hz, 1H), 4.73 (s, 1H), 4.06 (s, 2H), 4.03-3.99 (m, 2H), 3.93-3.84 (m, 3H), 3.79-3.69 (m, 1H), 3.48 (s, 3H), 2.01 (s, 3H), 1.07 (d, J=2.9 Hz, 6H); LC-MS (Method 2): $t_R$=4.24 min, m/z (M+H)$^+$=569.

Example 7. (R)-5-(2-(1-(2-hydroxy-2-methylpropyl)-1H-pyrazol-4-yl)-4-(3-(thiophen-2-yl)morpholino)quinazolin-6-yl)-1,3-dimethylpyridin-2(1H)-one (Cpd. 7)

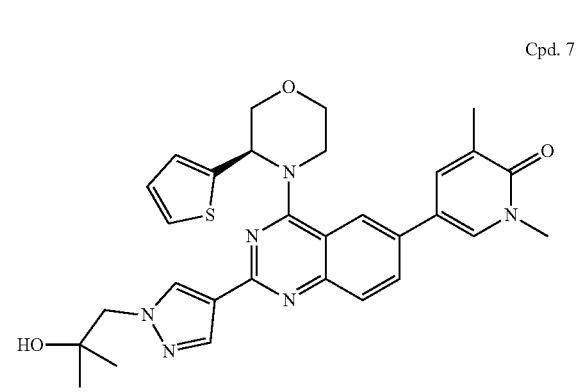 [SMILES: Cc1cc(-c2ccc3nc(-c4cnn(CC(C)(C)O)c4)nc(N4CCOC[C@@H]4c4cccs4)c3c2)cn(C)c1=O]

Cpd. 7

The title compound was prepared from 6-bromo-2,4-dichloroquinazoline and (R)-3-(thiophen-2-yl)morpholine following the similar procedure as described in Example 1. $^1$H NMR (400 MHz, DMSO-$d_6$) δ 8.29 (s, 1H), 8.03 (s, 1H), 8.02-7.91 (m, 3H), 7.79 (d, J=8.7 Hz, 1H), 7.57 (d, J=2.9 Hz, 1H), 7.48-7.40 (m, 1H), 7.18 (d, J=3.5 Hz, 1H), 7.01 (dd, J=5.1, 3.5 Hz, 1H), 5.81 (s, 1H), 4.73 (s, 1H), 4.19 (dd, J=11.9, 2.5 Hz, 1H), 4.13 (d, J=13.4 Hz, 1H), 4.06 (s, 2H), 4.02 (dd, J=12.0, 3.2 Hz, 1H), 3.97 (d, J=11.2 Hz, 1H), 3.89-3.76 (m, 1H), 3.66 (ddd, J=13.9, 10.6, 3.3 Hz, 1H), 3.48 (s, 3H), 2.02 (s, 3H), 1.07 (s, 6H); LC-MS (Method 2): $t_R$=4.00 min, m/z (M+H)$^+$=557.

Example 8. (S)-5-(4-(3-cyclobutylmorpholino)-2-(1-(2-hydroxy-2-methylpropyl)-1H-pyrazol-4-yl)quinazolin-6-yl-1,3-dimethylpyridin-2(1H)-one (Cpd. 8)

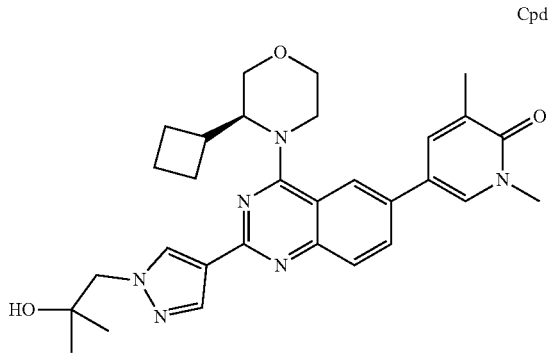

Cpd. 8

The title compound was prepared from 6-bromo-2,4-dichloroquinazoline and (S)-3-cyclobutylmorpholine following the similar procedure as described in Example 1. $^1$H NMR (400 MHz, DMSO-d$_6$) δ 8.26 (s, 1H), 8.04 (d, J=2.6 Hz, 1H), 8.02 (s, 1H), 7.93 (dd, J=8.8, 2.1 Hz, 1H), 7.89 (d, J=2.1 Hz, 1H), 7.80-7.76 (m, 1H), 7.74 (d, J=8.8 Hz, 1H), 4.73 (s, 1H), 4.60 (d, J=10.5 Hz, 1H), 4.07 (s, 2H), 3.87-3.72 (m, 5H), 3.53 (s, 3H), 3.22-3.15 (m, 1H), 2.09 (s, 3H), 1.97-1.96 (m, 1H), 1.78-1.68 (m, 3H), 1.57 (d, J=6.9 Hz, 1H), 1.31-1.16 (m, 2H), 1.08 (s, 6H); LC-MS (Method 2): t$_R$=3.97 min, m/z (M+H)$^+$=529.

Example 9. (S)-5-(4-(3-(4-chlorophenyl)morpholino)-2-(1-(2-hydroxy-2-methylpropyl)-1H-pyrazol-4-yl)quinazolin-6-yl-1,3-dimethylpyridin-2(1H)-one (Cpd. 9)

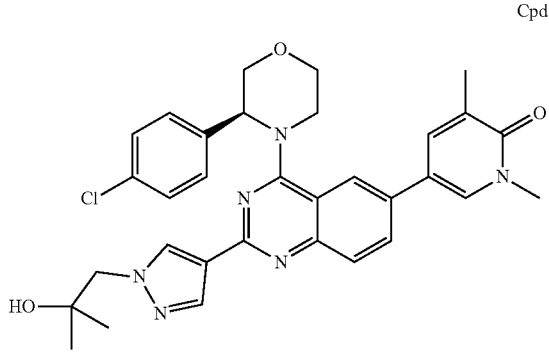

Cpd. 9

The title compound was prepared from 6-bromo-2,4-dichloroquinazoline and (S)-3-(4-chlorophenyl)morpholine following the similar procedure as described in Example 1. $^1$H NMR (400 MHz, DMSO-d$_6$) δ 8.23 (s, 1H), 8.02-7.93 (m, 3H), 7.90 (d, J=2.2 Hz, 1H), 7.77 (d, J=8.8 Hz, 1H), 7.59 (d, J=8.1 Hz, 2H), 7.49 (s, 1H), 7.37 (d, J=8.5 Hz, 2H), 5.29 (t, J=4.8 Hz, 1H), 4.73 (s, 1H), 4.06 (s, 2H), 4.01 (q, J=4.9, 3.8 Hz, 2H), 3.97-3.81 (m, 3H), 3.80-3.68 (m, 1H), 3.48 (s, 3H), 2.02 (s, 3H), 1.07 (d, J=3.3 Hz, 6H); LC-MS (Method 2): t$_R$=4.54 min, m/z (M+H)$^+$=585.

Example 10. 5-(4-((S)-3-cyclohexylmorpholino)-2-((S)-2-(hydroxymethyl)morpholino)quinazolin-6-yl)-1,3-dimethylpyridin-2(1H)-one (Cpd. 10)

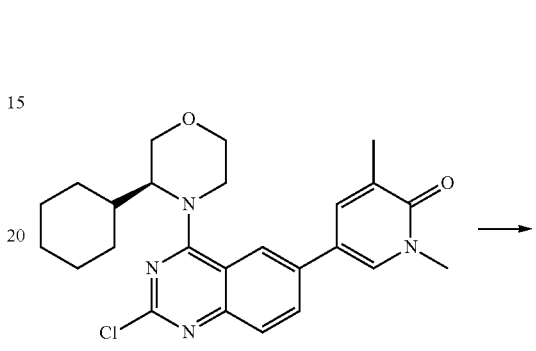

Cpd. 10

The starting material, (S)-5-(2-chloro-4-(3-cyclohexylmorpholino)quinazolin-6-yl)-1,3-dimethylpyridin-2(1H)-one, was prepared from 6-bromo-2,4-dichloroquinazoline and (S)-3-cyclohexylmorpholine following the similar procedure as described in Example 1.

In a microwave tube was placed (S)-5-(2-chloro-4-(3-cyclohexylmorpholino)quinazolin-6-yl)-1,3-dimethylpyridin-2(1H)-one (453 mg, 1 mmol) and (S)-morpholin-2-ylmethanol, HCl (461 mg, 3.00 mmol), and then EtOH (2 ml) and hunig's base (0.873 ml, 5.00 mmol) were added. The tube was sealed and heated at 90° C. for overnight. After cooling to rt, the mixture was concentrated to remove most of EtOH. Then, EtOAc/H$_2$O (5 mL/5 mL) was added. The organic layer was dried (Na$_2$SO$_4$) and filtered. After removal of solvent, the product was purified by silica gel chromatography using 0-5-10% MeOH/EtOAc as the eluent to give 5-(4-((S)-3-cyclohexylmorpholino)-2-((S)-2-(hydroxymethyl)morpholino)quinazolin-6-yl)-1,3-dimethylpyridin-2(1H)-one (349 mg, 0.654 mmol, 65.4% yield). $^1$H NMR (400 MHz, DMSO-d$_6$) δ 7.90 (d, J=2.7 Hz, 1H), 7.74-7.71 (m, 2H), 7.67 (dd, J=2.7, 1.3 Hz, 1H), 7.44-7.37 (m, 1H), 4.77 (t, J=5.5 Hz, 1H), 4.59 (d, J=13.0 Hz, 1H), 4.44 (d, J=13.1 Hz, 1H), 4.28 (d, J=10.3 Hz, 1H), 4.00 (t, J=11.4 Hz, 2H), 3.94-3.85 (m, 1H), 3.84-3.70 (m, 2H), 3.61 (dd, J=11.9, 2.8 Hz, 1H), 3.51 (s, 3H), 3.55-3.34 (m, 5H), 3.00-2.82 (m, 1H), 2.67 (dd, J=13.1, 9.7 Hz, 1H), 2.18 (dd, J=12.5, 9.1 Hz, 1H), 2.08 (s, 3H), 1.90-1.52 (m, 5H), 1.32-0.71 (m, 5H); LC-MS (Method 2): t$_R$=4.30 min, m/z (M+H)$^+$=534.

Example 11. 5-(2-((S)-2-(hydroxymethyl)morpholino)-4-((S)-3-phenylmorpholino)quinazolin-6-yl)-1,3-dimethylpyridin-2(1H)-one (Cpd. 11)

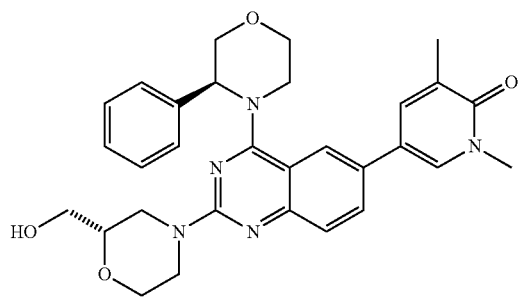

Cpd. 11

The title compound was prepared from 6-bromo-2,4-dichloroquinazoline and (S)-3-phenylmorpholine following the similar procedure as described in Example 10. $^1$H NMR (400 MHz, DMSO-$d_6$) δ 7.86 (d, J=2.7 Hz, 1H), 7.80-7.78 (m, 2H), 7.49 (d, J=7.3 Hz, 2H), 7.45-7.39 (m, 2H), 7.32 (t, J=7.5 Hz, 2H), 7.26-7.19 (m, 1H), 5.10 (t, J=5.0 Hz, 1H), 4.78 (t, J=5.7 Hz, 1H), 4.53 (d, J=12.9 Hz, 1H), 4.40 (d, J=13.2 Hz, 1H), 4.04-3.92 (m, 2H), 3.95-3.83 (m, 3H), 3.78-3.62 (m, 2H), 3.46 (s, 3H), 3.55-3.34 (m, 3H), 3.26 (s, 1H), 2.80 (t, J=12.3 Hz, 1H), 2.64 (dd, J=13.1, 10.5 Hz, 1H), 2.00 (s, 3H); LC-MS (Method 2): $t_R$=3.93 min, m/z (M+H)$^+$=528.

Example 12. (S)-5-(4-(3-cyclohexylmorpholino)-2-(1-(2-hydroxy-2-methylpropyl)-1H-pyrazol-4-yl)quinazolin-6-yl-1,3-dimethylpyridin-2(1H)-one (Cpd. 12)

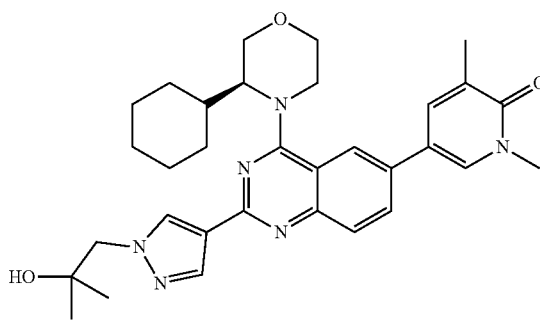

Cpd. 12

The title compound was prepared from 6-bromo-2,4-dichloroquinazoline and (S)-3-cyclohexylmorpholine following the similar procedure as described in Example 1. $^1$H NMR (400 MHz, DMSO-$d_6$) δ 8.24 (s, 1H), 8.01 (d, J=2.7 Hz, 1H), 8.00 (s, 1H), 7.91 (dd, J=8.7, 2.0 Hz, 1H), 7.86 (d, J=2.1 Hz, 1H), 7.75-7.72 (m, 2H), 4.73 (s, 1H), 4.51 (d, J=10.5 Hz, 1H), 4.12-4.08 (m, 4H), 3.93-3.78 (m, 2H), 3.68 (dd, J=11.9, 2.8 Hz, 1H), 3.53 (s, 3H), 3.57-3.46 (m, 1H), 2.27-2.19 (m, 1H), 2.10 (s, 3H), 1.89 (d, J=12.7 Hz, 1H), 1.79-1.70 (m, 2H), 1.59-1.56 (m, 2H), 1.08 (s, 6H), 1.31-0.71 (m, 5H); LC-MS (Method 2): $t_R$=4.43 min, m/z (M+H)$^+$=557.

Example 13. 4-(4-((S)-3-cyclohexylmorpholino)-2-((S)-2-(hydroxymethyl)morpholino)quinazolin-6-yl)-6-methyl-1,6-dihydro-7H-pyrrolo[2,3-c]pyridin-7-one (Cpd. 13)

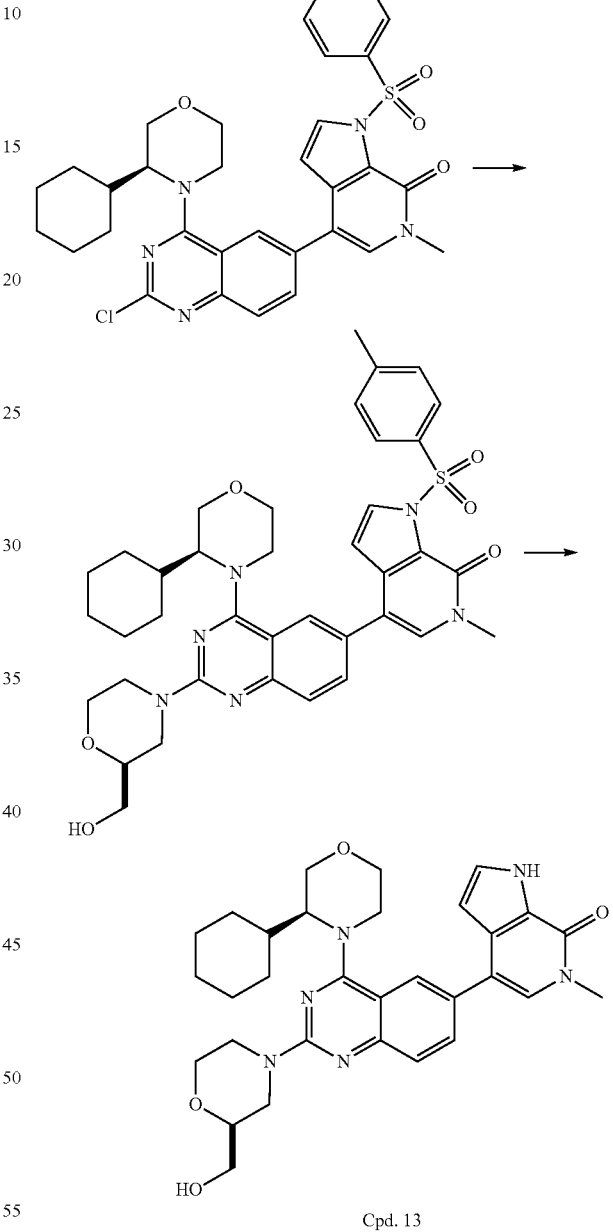

Cpd. 13

The starting material, (S)-4-(2-chloro-4-(3-cyclohexylmorpholino)quinazolin-6-yl)-6-methyl-1-tosyl-1,6-dihydro-7H-pyrrolo[2,3-c]pyridin-7-one, was prepared from 6-bromo-2,4-dichloroquinazoline and (S)-3-cyclohexylmorpholine following the similar procedure as described in Example 1. The title compound was prepared from (S)-4-(2-chloro-4-(3-cyclohexylmorpholino)quinazolin-6-yl)-6-methyl-1-tosyl-1,6-dihydro-7H-pyrrolo[2,3-c]pyridin-7-one and (S)-morpholin-2-ylmethanol, HCl following the similar procedure as described in Example 10 and Example 2. $^1$H NMR (400 MHz, DMSO-$d_6$) δ 12.14 (s, 1H), 7.83 (d, J=2.1 Hz, 1H), 7.74 (dd, J=8.7, 1.9 Hz, 1H), 7.46 (d, J=8.7 Hz, 1H), 7.39-7.32 (m, 2H), 6.37 (t, J=2.4 Hz, 1H), 4.77 (t, J=5.5 Hz, 1H), 4.61 (d, J=12.9 Hz, 1H), 4.46 (d, J=13.1 Hz, 1H), 4.25 (d, J=10.3 Hz, 1H), 4.00 (t, J=12.4 Hz, 2H), 3.94-3.86 (m, 1H), 3.79 (dd, J=10.9, 3.2 Hz, 1H), 3.73-3.59 (m, 2H), 3.57 (s, 3H), 3.54-3.34 (m, 5H), 2.92 (td, J=12.6, 3.5 Hz, 1H), 2.69 (dd, J=13.1, 9.7 Hz, 1H), 2.25-2.10 (m, 1H), 1.90-1.48 (m, 5H), 1.31-0.68 (m, 5H); LC-MS (Method 2): $t_R$=4.15 min, m/z (M+H)$^+$=559.

Example 14. (S)-4-(4-(3-cyclohexylmorpholino)-2-(1-(2-hydroxy-2-methylpropyl)-1H-pyrazol-4-yl)quinazolin-6-yl-6-methyl-1,6-dihydro-7H-pyrrolo[2,3-c]pyridin-7-one (Cpd. 14)

Cpd. 14

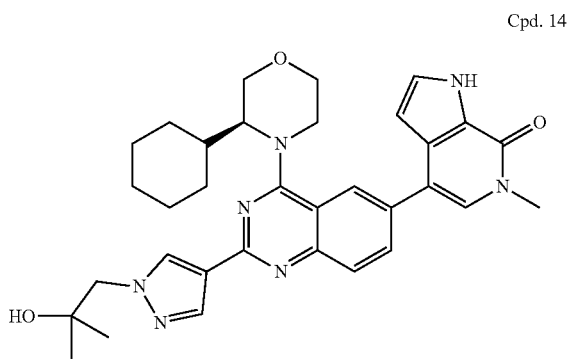 [SMILES: Cn1cc(-c2ccc3nc(-c4cnn(CC(C)(C)O)c4)nc(N4CCOC[C@@H]4C4CCCCC4)c3c2)c2cc[nH]c2c1=O]

The title compound was prepared from 6-bromo-2,4-dichloroquinazoline and (S)-3-cyclohexylmorpholine following the similar procedure as described in Example 2. $^1$H NMR (400 MHz, DMSO-$d_6$) δ 12.19 (s, 1H), 8.27 (s, 1H), 8.02 (s, 1H), 7.99 (d, J=2.1 Hz, 1H), 7.93 (dd, J=8.7, 2.0 Hz, 1H), 7.79 (d, J=8.5 Hz, 1H), 7.47 (d, J=1.9 Hz, 1H), 7.38 (t, J=2.7 Hz, 1H), 6.42 (t, J=2.5 Hz, 1H), 4.73 (d, J=1.4 Hz, 1H), 4.47 (d, J=10.3 Hz, 1H), 4.12-4.08 (m, 4H), 3.87-3.64 (m, 3H), 3.59 (s, 3H), 3.52 (dt, J=12.6, 6.6 Hz, 1H), 2.22 (d, J=10.7 Hz, 1H), 1.95-1.49 (m, 5H), 1.09 (s, 6H), 1.32-0.68 (m, 5H); LC-MS (Method 2): $t_R$=4.42 min, m/z (M+H)$^+$=582.

Example 15. 4-(4-((S)-3-(4-fluorophenyl)morpholino)-2-((S)-2-(hydroxymethyl)morpholino)quinazolin-6-yl)-6-methyl-1,6-dihydro-7H-pyrrolo[2,3-c]pyridin-7-one (Cpd. 15)

Cpd. 15

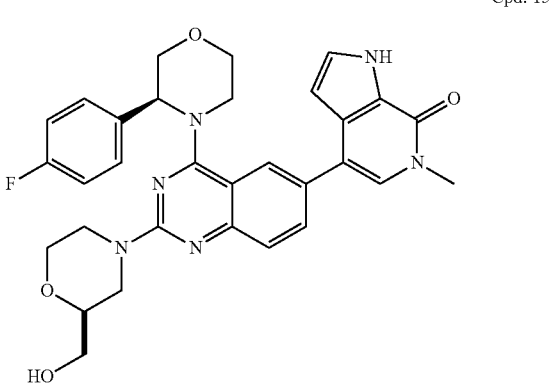

The title compound was prepared from 6-bromo-2,4-dichloroquinazoline and (S)-3-(4-fluorophenyl)morpholine following the similar procedure as described in Example 13. $^1$H NMR (400 MHz, DMSO-$d_6$) δ 12.13 (s, 1H), 7.99 (d, J=2.2 Hz, 1H), 7.82 (dd, J=8.7, 2.0 Hz, 1H), 7.53-7.42 (m, 3H), 7.36 (s, 1H), 7.32 (t, J=2.8 Hz, 1H), 7.07 (t, J=8.8 Hz, 2H), 6.37 (t, J=2.4 Hz, 1H), 5.03 (t, J=5.3 Hz, 1H), 4.80 (t, J=5.8 Hz, 1H), 4.53 (d, J=13.0 Hz, 1H), 4.40 (d, J=13.2 Hz, 1H), 3.92-3.86 (m, 5H), 3.72 (dt, J=13.5, 4.0 Hz, 1H), 3.56 (s, 3H), 3.54-3.41 (m, 4H), 3.26 (br s, 1H), 2.80 (t, J=12.7 Hz, 1H), 2.65 (dd, J=13.1, 10.5 Hz, 1H); LC-MS (Method 2): $t_R$=4.00 min, m/z (M+H)$^+$=571.

Example 16. BROMOscan Assay

Competitive ligand binding assays against bromodomains of BET family proteins, CBP, and p300 proteins were performed with BROMOscan® service at Eurofins DiscoverX Corporation (San Diego, CA).

Briefly, T7 phage displaying tandem bromodomains of BET family proteins, CBP, and p300 were grown in parallel in 24-well blocks in an *E. coli* host derived from the BL21 strain: *E. coli* were infected with T7 phage and incubated with shaking at 32° C. until lysis (90-150 minutes). The lysates were then centrifuged (5,000×g) and filtered (0.2 μm) to remove cell debris. To generate affinity resins for the assays, streptavidin-coated magnetic beads were treated with biotinylated small molecule or acetylated peptide ligands for 30 minutes at room temperature. The liganded beads were blocked with excess biotin and washed with SEA BLOCK Blocking Buffer (Thermo Fisher, Rockford, IL), 1% BSA, 0.05% Tween 20, 1 mM DTT) to remove unbound ligand and reduce non-specific phage binding. Binding reactions were assembled by combining DNA-tagged protein, liganded affinity beads, and test compounds in 1× binding buffer (17% SeaBlock, 0.33×PBS, 0.04% Tween 20, 0.02% BSA, 0.004% Sodium azide, 7.4 mM DTT). Test compounds were prepared as 1000× stocks in DMSO and subsequently diluted to ensure a final DMSO concentration of 0.1%. The assay plates were incubated at room temperature with shaking for 1 hour and the affinity beads were washed with wash buffer (1×PBS, 0.05% Tween 20). The beads were then re-suspended in elution buffer (1×PBS, 0.05% Tween 20, 2 μM non-biotinylated affinity ligand) and incubated at room temperature with shaking for 30 minutes. The DNA-tagged protein concentrations in the eluates were then measured by qPCR. $K_d$ values were obtained using a 3-fold serial dilution across 11 compound concentrations ranging from 0 μM to 10 μM. $K_d$ values were calculated with a standard dose-response curve using Hill equation with a slope of −1. Curves were fitted using a non-linear least square fit with the Levenberg-Marquardt algorithm.

Example 17. AlphaScreen Assay

AlphaScreen® assay, an assay based on Fluorescence Resonance Energy Transfer (FRET), was conducted by following manufacturer's protocol (PerkinElmer, Waltham, MA) at Reaction Biology (Malvern, PA) utilizing full-length recombinant human BRD4 corresponding to amino acid position 2-1362 (NCBI Reference Sequence: NM_058243) expressed in Sf9 insect cells with an N-terminal His-tag (Reaction Biology Catalog No. RD-21-153), and histone H4 peptide (1-21) containing acetylated lysine residues at positions 5, 8, 12 and 16 as the ligand. Briefly, BRD4 and test compounds were pre-incubated for 30 minutes at room temperature in 50 mM HEPES, pH7.5, 100 mM NaCl, 0.05% CHAPS, 0.1% BSA across 11 compound concentrations ranging from 0 μM to 20 μM obtained with a 3-fold serial dilution. H4 ligand peptide was then added and the mixture was incubated for another 30 minutes at room temperature. Streptavidin-coated donor beads and Ni acceptor beads were then added, and the mixture was incubated for additional 60 minutes. Fluorescent measurements (Ex/Em=680/520-620 nm) were taken and the data were fitted to the Hill equation with variable slopes to obtain $IC_{50}$ values.

Example 18. MV4-11 Assay

Cell lines: The MV4-11 cell line were obtained from American Type Culture Collection (ATCC, Manassas, VA, USA) and cultured in RPMI 1640 (Invitrogen 11879020) culture medium supplemented with 10% fetal bovine serum and 100 units/mL Penicillin, 100 μg/mL Streptomycin and maintained in a 37° C., 5% $CO_2$/95% humidified air incubator.

Cytotoxicity Assay: MV4-11 cells were cultured as described above, and plated in 1536-well white solid tissue culture plates using a Multidrop Combi peristaltic dispenser (ThermoFisher, Waltham, MA) at a density of 500 cells/well in 5 μL of RPMI 1640 (Invitrogen 11879020) culture medium supplemented with 10% fetal bovine serum and 100 units/mL Penicillin, 100 μg/mL Streptomycin. A 1536-well pintool dispenser outfitted with 20 nL pins (Wako Automation, San Diego, CA) was used to transfer 23 nL of compound in DMSO to the 1536-well assay plates. After 72 hr incubation at 37° C., 2.5 μL of CellTiter-Glo (Promega) was dispensed into each well using a BioRAPTR FRD dispenser (Beckman Coulter, Brea, CA). Plates were incubated at room temperature for 10 minutes, transferred to a ViewLux microplate imager (Perkin Elmer, Waltham, MA) and the ATP-coupled luminescence was measured using a 1 second exposure.

Example 19. Kasumi-1 Assay

Cell viability assay: Cell viability assay was conducted to obtain GI50, the compound concentration resulting in 50% growth inhibition, using an acute myeloid leukemia cell line Kasumi-1 (ATCC® CRL-2724™) (ATCC, Manassas, VA). Briefly, cells were seeded on a 96-well flat-bottom cell culture plate at the density of 30,000 cells per well (MV-4-11) or 10,000 cells per well (Kasumi-1) in RPMI supplemented with 10% fetal bovine serum and L-glutamine plus penicillin and streptomycin. Cells were maintained at 37° C. with 5% $CO_2$ for 24 hours then exposed to a given compound at either 11 or 21 concentrations ranging from 0 μM to 20 μM in a 150 μL volume in the presence of 0.2% dimethyl sulfoxide, the solvent used in serial dilution of the compound. The exposure was maintained for approximately 72 hours and the cell viability was measured using CellTiter-Blue® (Promega, Madison, WI) according to manufacturer's instruction. $GI_{50}$ values were calculated using a four-parameter dose-response model in Graph Pad Prism (La Jolla, CA).

TABLE 2

Biological assay data.

| Cpd. | BRD4 (BD1, 2) Kd (nM) | AlphaScreen $IC_{50}$ (nM) | MV4-11 $IC_{50}$ (nM) | Kasumi-1 $IC_{50}$ (nM) | CBP Kd (nM) | P300 Kd (nM) |
|---|---|---|---|---|---|---|
| 1 | ++++ | ++++ | +++ | ++++ | ++++ | ++++ |
| 2 | ++++ | ++++ | ++++ | ++++ | ++++ | ++++ |
| 3 | ++++ | +++ | ++ | NA | +++ | +++ |
| 4 | ++++ | ++++ | ++++ | NA | ++++ | ++++ |
| 5 | ++++ | ++++ | +++ | ++++ | ++++ | ++++ |
| 6 | ++++ | ++++ | +++ | ++++ | ++++ | ++++ |
| 7 | NA | NA | NA | NA | NA | NA |
| 8 | NA | NA | NA | NA | NA | NA |
| 9 | NA | NA | NA | NA | NA | NA |
| 10 | NA | NA | NA | NA | +++ | +++ |
| 11 | NA | NA | NA | NA | ++++ | ++++ |
| 12 | NA | NA | NA | NA | +++ | +++ |
| 13 | NA | NA | NA | NA | ++++ | ++++ |
| 14 | NA | NA | NA | NA | ++++ | +++ |
| 15 | NA | NA | NA | NA | ++++ | ++++ |

Column symbols:
++++ refers to activity <100 nM,
+++ refers to 100 nM ≤ activity < 0.5 μM;
++ refers to 0.5 μM ≤ activity < 5.0 μM;
+ refers to activity ≥5.0 μM.
NA: data not available.

TABLE 3

Biological assay data of selected compounds against bromodomain of BET family proteins.

| Bromodomain | Cpd. 1, $K_d$ (nM) | Cpd. 2, $K_d$ (nM) |
|---|---|---|
| BRD2 (BD1) | ++++ | ++++ |
| BRD2 (BD1, 2) | ++++ | ++++ |
| BRD2 (BD2) | ++++ | ++++ |
| BRD3 (BD1) | ++++ | ++++ |
| BRD3 (BD1, 2) | ++++ | ++++ |
| BRD3 (BD2) | ++++ | ++++ |
| BRD4 (BD1) | ++++ | ++++ |
| BRD4 (BD1, 2) | ++++ | ++++ |
| BRD4 (BD2) | ++++ | ++++ |
| BRDT (BD1) | ++++ | ++++ |
| BRDT (BD1, 2) | ++++ | ++++ |
| BRDT (BD2) | ++++ | ++++ |

Column symbols:
++++ refers to activity <100 nM,
+++ refers to 100 nM ≤ activity < 0.5 μM;
++ refers to 0.5 μM ≤ activity < 5.0 μM;
+ refers to activity ≥5.0 μM.
NA: data not available.

Example 20. Mouse Kasumi-1 Xenograft Study

The Kasumi-1 xenograft study was conducted by HD Biosciences (Shanghai, China) in their AAALAC accredited facility. All animal study procedures were approved by the Institutional Animal Care and Use Committee (IACUC) of HD Biosciences. Kasumi-1 human leukemia tumor model was established in female CB-17 SICD mice by subcutaneous injection in the right flank with Kasumi-1 cell suspension (1×10$^7$/0.2 mL of 1:1 DPBS and BD Matrigel). Tumors were allowed to grow to 100~150 mm$^3$ and the mice were randomly divided into 6 groups (8 animals/group) with similar mean tumor volume and body weight. Compounds were formulated as solution in 30% solutol in water and adjust pH with 1.05 equivalency of HCl (using 0.1N HCl (aq)) in situ, whereas the reference compound, I-BET762, was formulated with 2% DMSO+98% (20% HP-β-CD in water). Compounds were administered to the mice via oral gavage once daily and the tumor measurements were taken daily for the subsequent 4 weeks. Tumor volumes were monitored and measured twice a week. The animals were then sacrificed at the conclusion of the study to obtain the tumor weights (FIG. 1).

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims. It should be appreciated by those persons having ordinary skill in the art(s) to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations. Such combinations are considered to be part of the present invention contemplated by this disclosure.

We claim:
1. A compound of Formula (I),

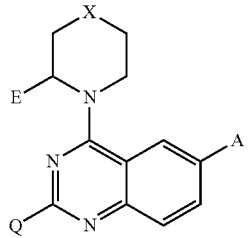

Formula (I)

wherein:
X is O, NH, NC(O)C$_{1-3}$alkyl,

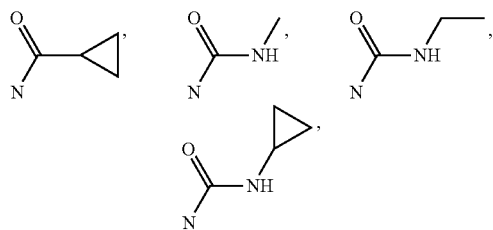

or NS(O)$_2$Me;
A is

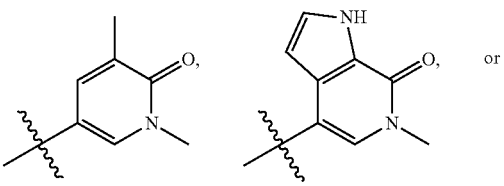

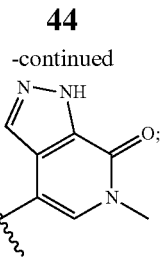

E is

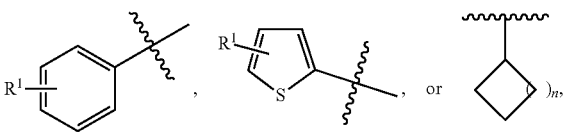

wherein R$^1$ is H, halogen, or Me; n is 0, 1, 2, or 3; and
Q is one of the following:

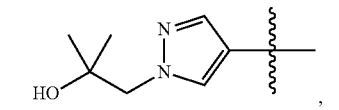

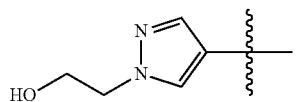

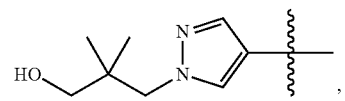

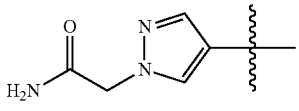

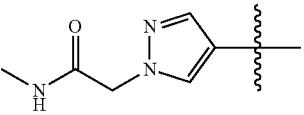

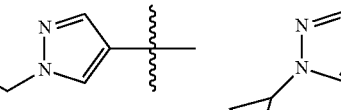

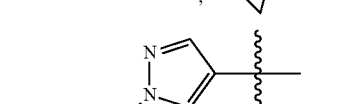

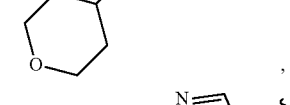

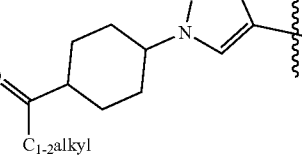

-continued
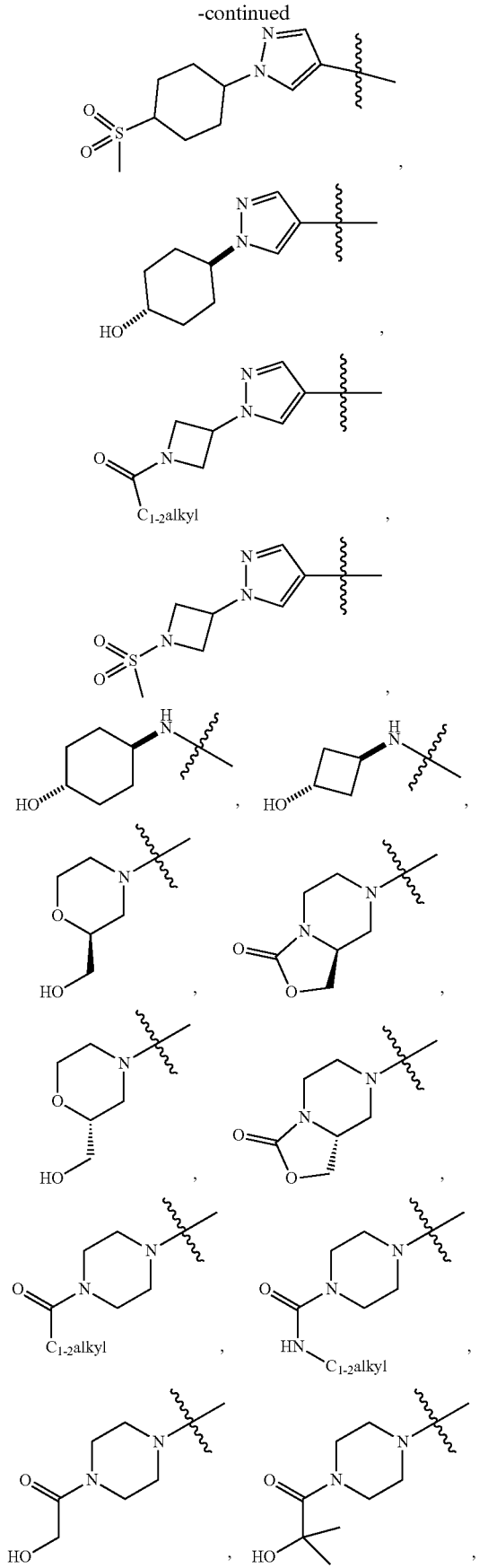
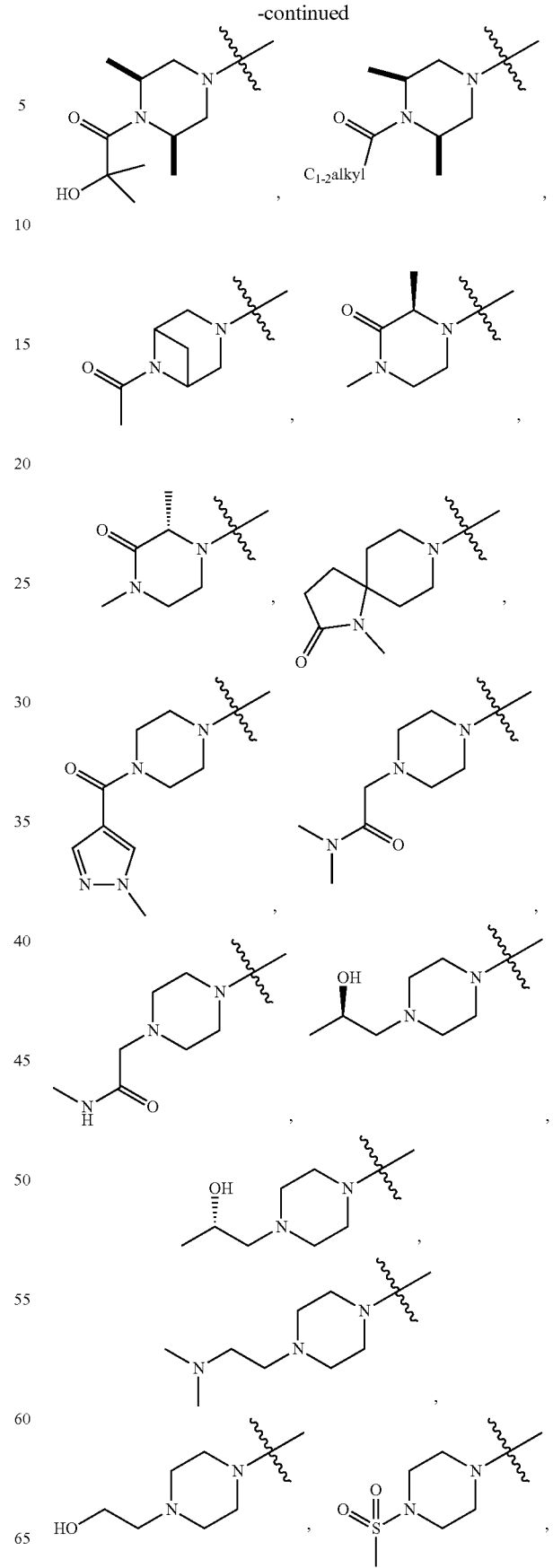

-continued
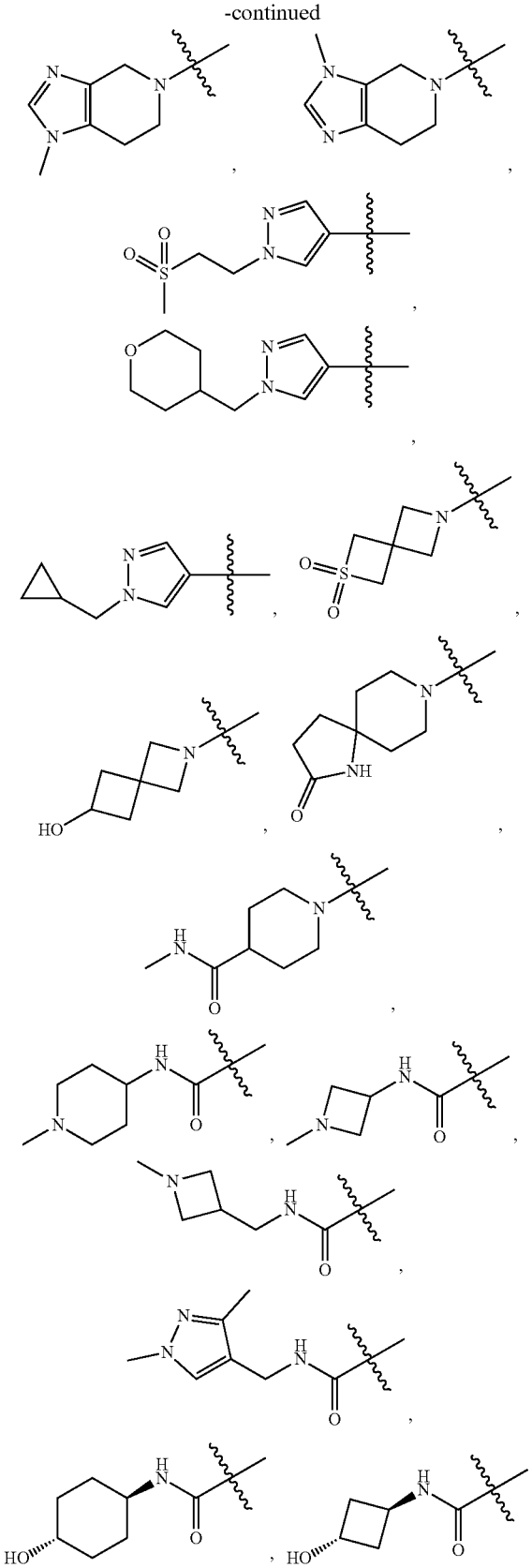
and/or a tautomer, optical- or stereo-isomer thereof, or pharmaceutically acceptable salt thereof.
2. The compound according to claim 1, wherein:
A is
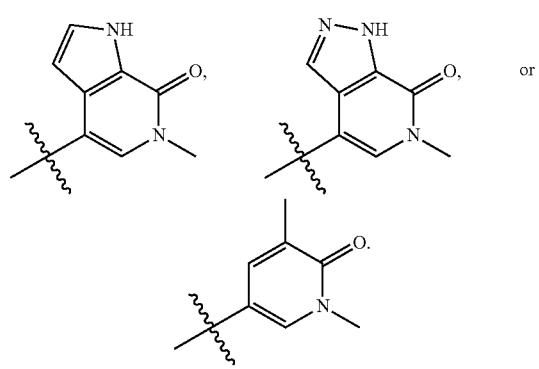
3. The compound according to claim 1, wherein X is O;
A is
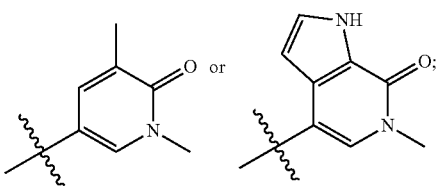
E is
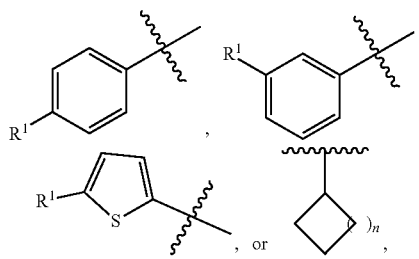
wherein $R^1$ is H, F, Cl; n is 0, 1, 2, or 3; and Q is
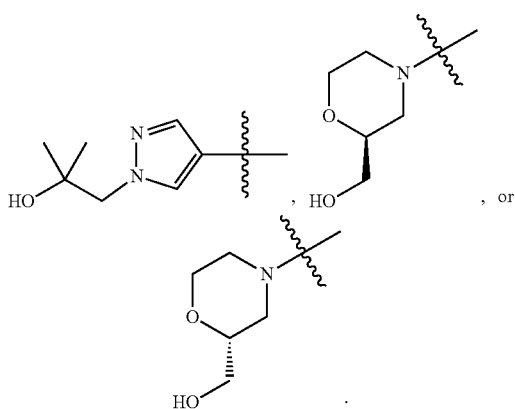

4. The compound according to claim 1, wherein
X is O;
A is

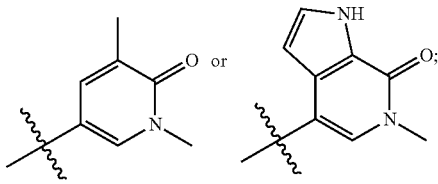

E is

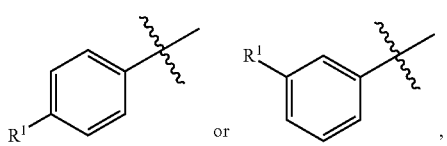

wherein R¹ is H, F, Cl; and
Q is

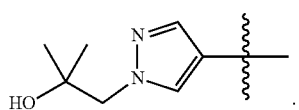 [SMILES: *c1cnn(CC(C)(C)O)c1]

5. The compound of claim 1, wherein the compound is Formula (II),

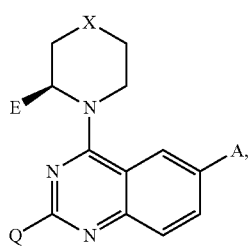

Formula (II)

or a pharmaceutically acceptable salt thereof.

6. The compound according to claim 5, wherein the compound is selected from one of the following:

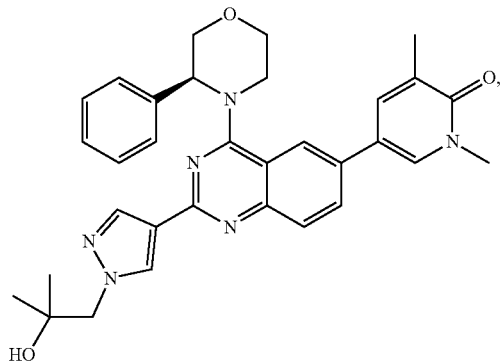

-continued

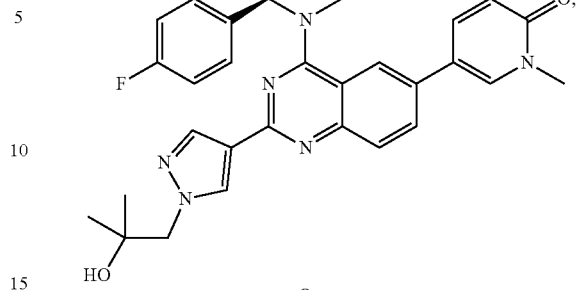

7. The compound according to claim 5, wherein:
A is

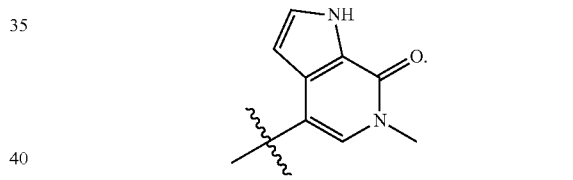

8. The compound according to claim 5, wherein:
A is

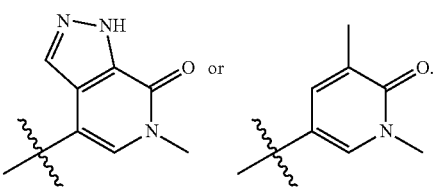

9. The compound according to claim 5, wherein:
X is O, NC(O)Me, or NS(O)₂Me; A is

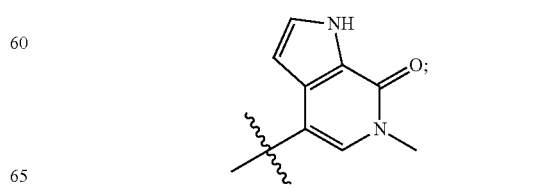

and E is
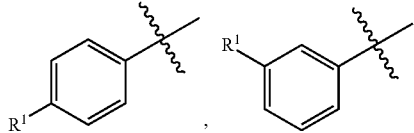
wherein R¹ is H, F, Cl; n is 0, 1, 2, or 3.
10. The compound according to claim 5, wherein:
X is O, NC(O)Me, or NS(O)₂Me; A is
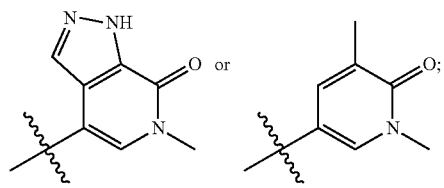
and E is
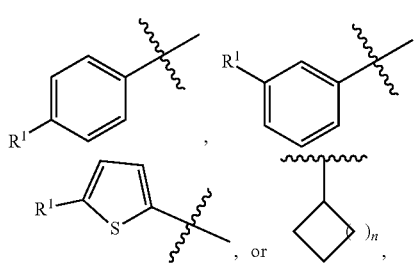
wherein R¹ is H, F, Cl; n is 0, 1, 2, or 3.
11. The compound according to claim 5, wherein the compound is selected from the group consisting of:
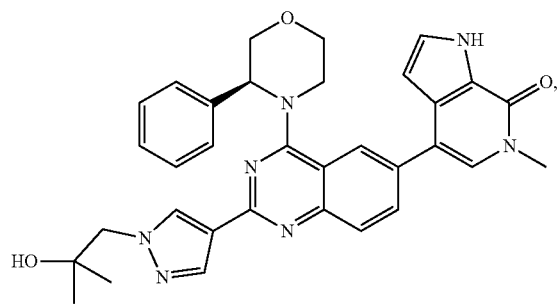
-continued
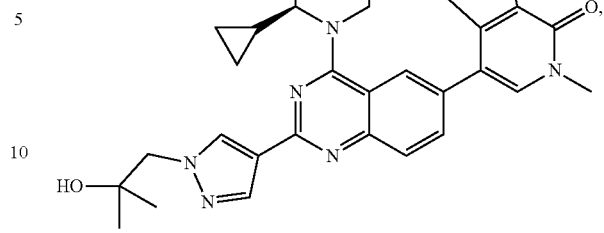
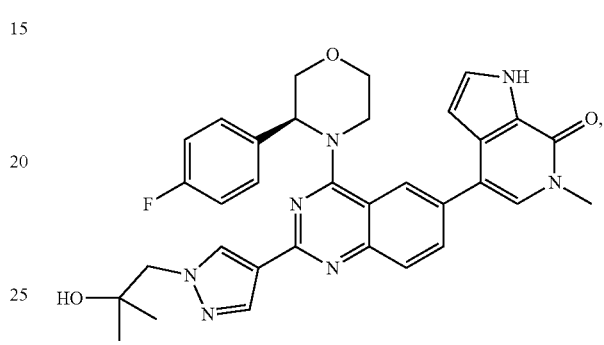
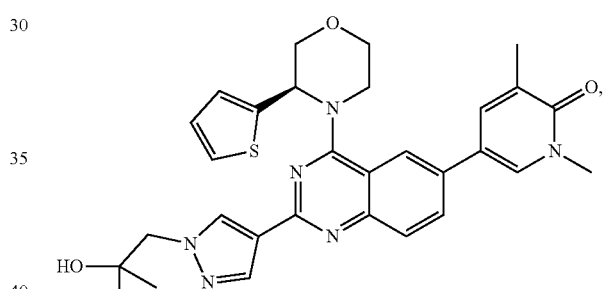
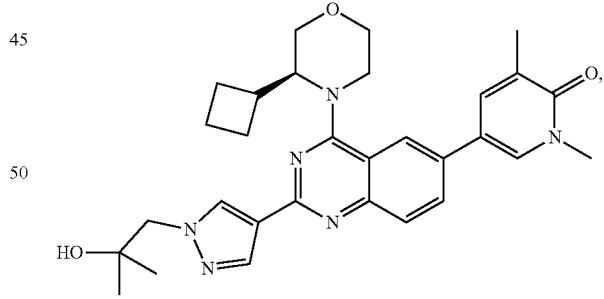
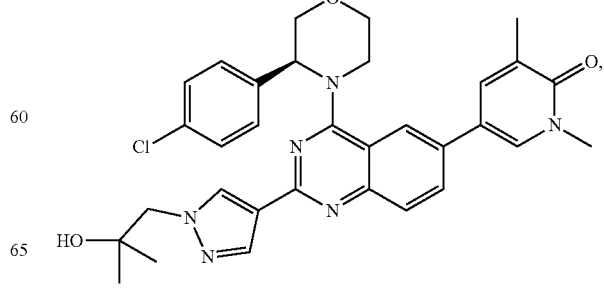

-continued
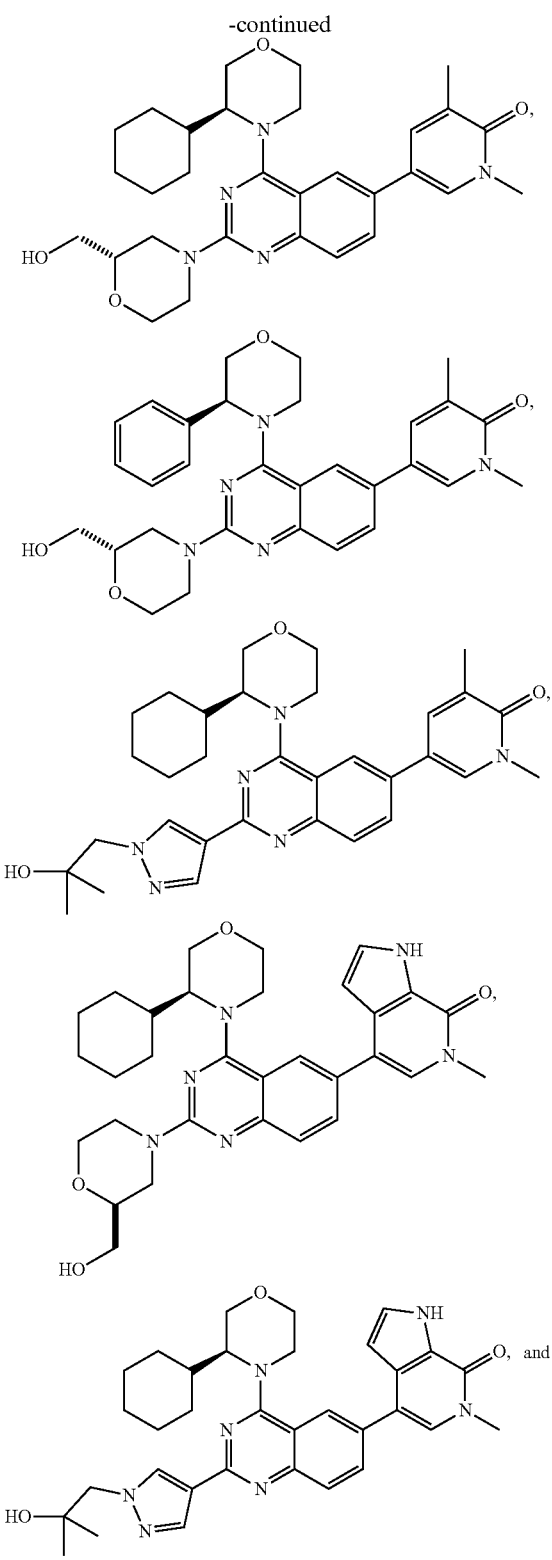
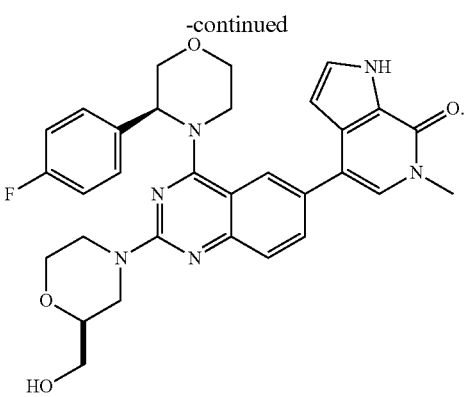
12. The compound according to claim 5, wherein the compound is
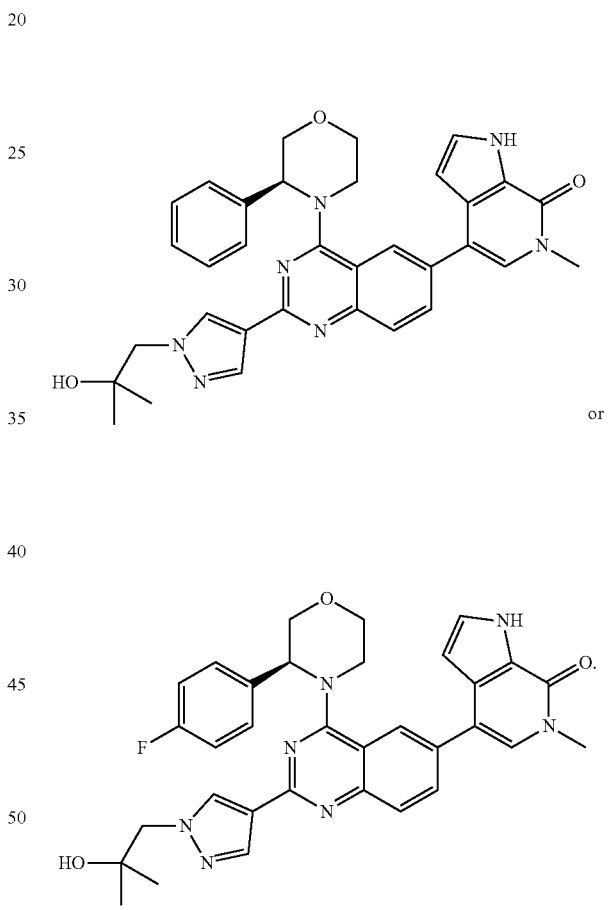
13. A pharmaceutical composition comprising a compound according to claim 1, or a pharmaceutically acceptable salt thereof, and a pharmaceutically acceptable carrier.
* * * * *